United States Patent [19]
Kaneko et al.

[11] Patent Number: 6,062,189
[45] Date of Patent: May 16, 2000

[54] SPARK IGNITION TYPE IN-CYLINDER INJECTION INTERNAL COMBUSTION ENGINE

[75] Inventors: Katsunori Kaneko; Hiromitsu Ando, both of Okazaki; Katsuhiko Miyamoto, Funai-gun; Mikiji Watanabe; Hiroyuki Tanaka, both of Kyoto; Hideyuki Oda, Nagoyo; Kenji Goto, Kyoto; Kazuchika Tashima, Anjo; Hiroki Tamura, Hoi-gun; Hitoshi Kamura, Kyoto; Atsuyoshi Kojima, Toyota, all of Japan

[73] Assignee: Mitsubishi Jidosha Kogyo Kabushiki Kaisha, Tokyo, Japan

[21] Appl. No.: 08/988,929

[22] Filed: Dec. 11, 1997

[30] Foreign Application Priority Data

Dec. 19, 1996 [JP] Japan ................................ 8-340165
May 8, 1997 [JP] Japan ................................ 9-118057

[51] Int. Cl.⁷ ........................................ F02B 17/00
[52] U.S. Cl. ...................... 123/295; 123/299; 123/305
[58] Field of Search ............................. 123/295, 299, 123/300, 305

[56] References Cited

U.S. PATENT DOCUMENTS 5,078,107  1/1992  Morikawa ........................ 123/295
5,271,362  12/1993  Kobayashi et al. ............... 123/299
5,642,705  7/1997  Morikawa et al. ............... 123/300

FOREIGN PATENT DOCUMENTS 0491381   6/1992   European Pat. Off. .
0661432   7/1995   European Pat. Off. .
195 15 508  11/1995  Germany .
4-183951  6/1992   Japan .
4-187851  7/1992   Japan .
5-272373  10/1993  Japan .

OTHER PUBLICATIONS

H. P. Lentz, et al., "Internationales Wiener Motorensymposium, Apr. 24–25, 1997, Reihe 12", 1997 VDI Verlag GmbH, Düsseldorf, XP002056784, pp. 92–137.

*Primary Examiner*—Tony M. Argenbright

[57] ABSTRACT

In order to securely prevent knocks from occurring upon starting and the like, while enhancing the compression ratio in a spark ignition type in-cylinder injection internal combustion engine which includes a fuel injection valve for directly injecting fuel into a combustion chamber, fuel is injected during a compression stroke in a specific operation region under an intermediate to high load to perform stratified combustion. Further provided is a control unit for driving and controlling the fuel injection valve such that, in the stratified combustion, prior to the fuel injection during the compression stroke, fuel is injected from the fuel injection valve during an intake stroke by such an amount that fuel fails to self-ignite.

15 Claims, 14 Drawing Sheets

LATER STAGE OF COMPRESSION STROKE
(INJECTION TIMING)

① AIR/FUEL MIXTURE FORMED AT INTAKE STROKE INJECTION (A/F: 30~60)

② AIR/FUEL MIXTURE FORMED AT COMPRESSION STROKE INJECTION (A/F: 15)

EARLIER STAGE OF EXPANSION STROKE
(LATER STAGE OF COMBUSTION)

③ • BURNING OF LEAN AIR/FUEL MIXTURE IGNITED BY SOOT
• REBURNING OF SOOT

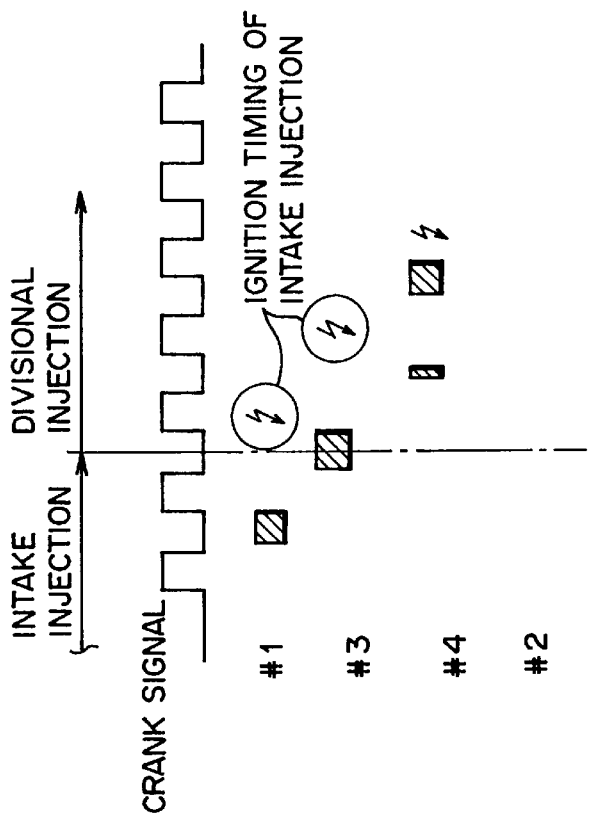
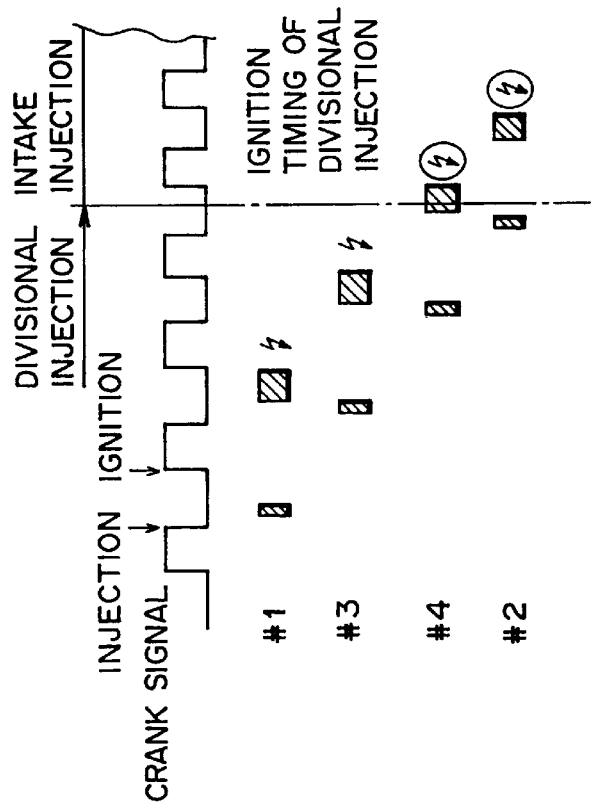
FIG. 11 (A)
FIG. 11 (B)

SPARK IGNITION TYPE IN-CYLINDER INJECTION INTERNAL COMBUSTION ENGINE

BACKGROUND OF THE INVENTION

1. Field of the Invention

This invention relates to a spark ignition type in-cylinder injection internal combustion engine, which can inject fuel during its compression stroke to perform stratified combustion, and, in particular, to a spark ignition type in-cylinder injection internal combustion engine, which is suitably used as an automobile engine.

2. Description of Background Art

Recently in practical use is a spark ignition type in-cylinder injection internal combustion engine, which performs spark ignition by use of a spark plug and directly injects fuel into a cylinder. Such a spark ignition type in-cylinder injection internal combustion engine can improve both its fuel consumption performance and output performance by utilizing its characteristic features that its injection timing can freely be set and that the state of formation of air/fuel mixture can freely be controlled.

Namely, by injecting fuel during a compression stroke, the spark ignition type in-cylinder injection internal combustion engine can perform, due to stratified combustion, an operation (ultra-lean burn operation) in a state where fuel is quite lean (i.e., where the air/fuel ratio is much higher than a stoichiometric air/fuel ratio), and is equipped with an ultra-lean operation mode (compressed lean operation mode) as its combustion mode, thus allowing fuel consumption ratio to greatly improve.

On the other hand, it can perform a pre-mixture burn operation mainly by injecting fuel during an intake stroke, of course. In this case, by directly injecting fuel into a combustion chamber (within a cylinder), most of injected fuel can securely be burned within its combustion cycle, thus contributing to improving output as well.

It is also possible, in such a pre-mixture burn operation to set, as combustion mode, a lean operation mode (intake lean operation mode) for performing an operation in a state where fuel is lean (i.e., where the air/fuel ratio is higher than the stoichiometric air/fuel ratio) but richer than that in the ultra-lean mode, a stoichiometric operation mode (stoichiometric feedback operation mode) for performing feedback control based on information from an $O_2$ sensor or the like so that the air/fuel ratio becomes the stoichiometric air/fuel ratio, and an enriched operation mode (open-loop mode) for performing an operation in a state where fuel is rich (i.e., the air/fuel ratio is lower than the stoichiometric air/fuel ratio).

Then, among these various kinds of operation modes, an appropriate mode is selected according to an operation state of the engine, i.e., state of engine speed and load, to control the engine.

In general, when the output required for the engine is small, i.e., when both engine speed and load are low, the compressed lean mode is selected in order to improve fuel consumption ratio; and as the engine speed and engine load increase from there, the intake lean operation mode, stoichiometric operation mode, and enriched operation mode are successively selected.

Meanwhile, in general as shown in FIG. 14(B), the higher the temperature or pressure in the combustion chamber is, self-ignition of fuel and knocking of the engine are more likely to occur, thus limiting improvement in compression ratio from the viewpoint of knocking elimination. In the spark ignition type in-cylinder injection internal combustion engine, by contrast, knocking is hard to occur because air inducted in the combustion chamber is cooled by injecting fuel from an early stage of an intake stroke, whereby compression ratio can be set higher.

On the other hand, it has been found that, when the compression ratio is set higher in the spark ignition type in-cylinder injection internal combustion engine, knocking occurs only for a short period of time upon starting in the case of a vehicle equipped with an automatic transmission (AT vehicle) in particular. When gasoline is used as fuel, this phenomenon is more remarkable with gasoline having a lower octane number (regular gasoline) than that having a higher octane number (premium gasoline).

It is presumed that knocking occurs in the AT vehicle upon starting due to a low speed and high load state generated at that time.

Namely, as shown in FIG. 15, upon starting the AT vehicle, as an accelerator is activated from an idle operation state, the intake air amount drastically increases in response to a rapid increase in throttle opening angle, thereby dramatically enhancing the engine load. By contrast, the engine rotational speed increases slower than the engine load, thus temporarily yielding a low-speed and high-load state (see region LH in FIG. 15) though for a short period of time.

Namely, when the engine operates at a low speed under high load, the stoichiometric operation mode or enriched operation mode is adopted. These modes attain an air/fuel ratio (on the order of 12 to 18), at which knocking is likely to occur, as shown in FIG. 14(A). Also, in this operation mode, while a large amount of fuel is injected into the combustion chamber from the first half of the intake stroke, a low speed state is temporarily generated as mentioned above, whereby it takes a long time for the injected fuel to be atomized, thus becoming easy to self-ignite. Consequently, knocking is very likely to occur in the low-speed and high-load state.

In a vehicle equipped with a manual transmission (MT vehicle), since the engine rotational speed rises during a delay in clutch operation, knocking upon starting occurs less frequently than in the AT vehicle.

As means against such starting knocks, the ignition timing may be retarded. Nevertheless, retarding control is limited in order to secure starting torque, thus making it difficult to sufficiently prevent starting knock from occurring.

Accordingly, further proposed as means against starting knock is, for example, setting an idle speed higher in the D range of the AT vehicle to suppress the degree of lowering the rotational speed upon starting and secure the starting torque.

When the idle speed is set higher, however, fuel consumption ratio consequently deteriorates.

An example of techniques for preventing knocks in the spark ignition type in-cylinder injection internal combustion engine is disclosed in Japanese Patent Application Laid-Open (Kokai) No. HEI 7-189767. In this technique, fuel is injected a plurality of times, so that a uniform air/fuel mixture is formed at an earlier injection, and a spark is generated at a later injection in the vicinity of an ignition timing, whereby the uniform air/fuel mixture formed at the earlier injection is rapidly burned, in order to prevent knocks.

This technique is supposed to utilize fumigation which is one of knock preventing methods in diesel engines. Here, fumigation refers to a technique in which, in an intake stroke in a diesel engine, while fuel is being atomized or vaporized, it is mixed into intake air to such an extent that the air/fuel mixture does not cause self-ignition, whereby the retardation of ignition is reduced by a preflame reaction during a compression stroke, thus preventing knocks.

In order to adopt fumigation in a spark ignition type in-cylinder injection internal combustion engine, for example, fuel injection (earlier injection) may be performed at an intake stroke while preventing thus injected fuel from self-igniting, and ignition may be effected after fuel injection is performed at a compression stroke. Here, it is important for the fuel in the earlier injection to be kept from self-igniting. The above-mentioned publication, however, fails to specifically disclose how to prevent the earlier injected fuel from self-igniting. Rather, the earlier fuel injection amount is disclosed as being set greater, by which the earlier injected fuel is likely to self-ignite, thus failing to securely prevent knocking.

Also, while fumigation is effective in preventing knocks and increasing output, it disadvantageously increases the HC (hydrocarbon) amount in exhaust gas, which may result in problematic exhaust gas odor in diesel engines. In the case where an antiknock technique based on fumigation is adopted in a spark ignition type in-cylinder injection internal combustion engine, though its advantages are supposed to be utilized without yielding so much problems in terms of exhaust gas odor, it is necessary for such technique to be used under an appropriate condition in view of the overall performance of the engine. Nevertheless, the above-mentioned publication fails to fully disclose this point, thus leaving problems concerning such a control condition for preventing knocks.

SUMMARY OF THE INVENTION

In view of the foregoing problems, it is an object of the present invention to provide a spark ignition type in-cylinder injection internal combustion engine, which can enhance compression ratio to securely prevent knocking at the time of starting or the like without increasing idle speed and without generating adverse effects caused by the knocking prevention, while being capable of yielding sufficient output.

Accordingly, the present invention provides a spark ignition type in-cylinder injection internal combustion engine that comprises a fuel injection valve for directly injecting fuel into a combustion chamber, and injects fuel during a compression stroke in a specific operation region under an intermediate to high load to perform stratified combustion; further comprising control means for driving and controlling the fuel injection valve such that, in the stratified combustor, prior to the fuel injection during the compression stroke, fuel is injected from the fuel injection valve during an intake stroke by such an amount that the fuel fails to self-ignite.

In this configuration, at the time of stratified combustion, prior to the fuel injection during the compression stroke, fuel is injected from the fuel injection valve during an intake stroke by such an amount that the fuel fails to self-ignite. As stratified combustion is performed upon ignition after the fuel injection during the compression stroke, the fuel injected during the compression stroke does not have enough time to proceed with a knocking reaction, thus failing to self-ignite. Of course, the fuel injected during the intake stroke does not self-ignite either, whereby knocks can be prevented from occurring under such a combustion condition, i.e., the specific operation region under the intermediate to high load.

Also, in the process in which stratified combustion of the fuel injected at the compression stroke is under way; while the air/fuel mixture containing the fuel injected during the intake stroke beforehand is being burned, it contributes to burning the unburned portion of the fuel injected at the compression stroke and, consequently, to increasing the output of the engine and purifying the gas.

Further, in the case where the specific operation state is an engine speed lower than a predetermined engine speed, for example, it is possible to broaden a knocking limit output region which can secure a torque required for starting without knocking, thus allowing a required output to be secured without knocking even upon sudden starting or the like, whereby a feeling of acceleration can be improved. Also, since the starting torque is fully secured, the idle speed can be set low, thus allowing the fuel consumption ratio upon idling to improve.

In this case, the specific operation state is preferably an engine speed lower than a preset engine speed (e.g., 2,500 rpm). Consequently, the operation region upon starting, i.e., knocking limit output region where a torque required for starting is secured without knocking, can be broadened in particular. Thus, in the case where the accelerator is stepped on to a level corresponding to a full-open state, for example, a required output can be secured without knocking, thus allowing a feeling of acceleration to improve. Also, since the starting torque is fully secured, the idle speed can be set low, thus allowing the fuel consumption ratio upon idling to improve.

Though the fuel injection may be performed once in the intake stroke, it may also be effected a plurality of times in the case where fuel cannot be injected upon one injection fully or appropriately in terms of performance of the fuel injection valve.

Preferably, the control means drives and controls the fuel injection valve such that fuel is mainly injected during the compression stroke under a low load to perform stratified combustion, whereas fuel is mainly injected during the intake stroke under the intermediate to high load except for the specific operation region to perform pre-mixture combustion.

In this configuration, since fuel is mainly injected during the compression stroke under a low load to perform stratified combustion, whereas fuel is mainly injected during the intake stroke under the intermediate to high load except for the specific operation region to perform pre-mixture combustion, optimal combustion can be realized according to the operation state, thus allowing the fuel consumption ratio and output of the engine to improve.

Preferably, the control means drives and controls the fuel injection valve such that, in the specific operation region under the intermediate to high load, a substantially constant amount of fuel is injected during the intake stroke, whereas an amount of fuel substantially proportional to a state of load is injected during the compression stroke.

In this configuration, in the specific operation region under the intermediate to high load, a substantially constant amount of fuel is injected during the intake stroke, whereas an amount of fuel substantially proportional to a state of load is injected during the compression stroke; whereby combustion suitable for the operation state can be realized by a very simple control, thus allowing the fuel consumption ratio and output of the engine to improve.

Preferably, the control means drives and controls the fuel injection valve such that, in the specific operation region under the intermediate to high load, fuel is injected during the intake stroke by such an amount that an air/fuel ratio becomes on the order of 30 to 60, whereas fuel is injected during the compression stroke by such an amount that a total air/fuel ratio becomes richer than a stoichiometric air/fuel ratio.

In this configuration, in the specific operation region under the intermediate to high load, fuel is injected in the intake stroke by such an amount that an air/fuel ratio becomes on the order of 30 to 60, whereas fuel is injected by such an amount that a total air/fuel ratio becomes richer than a stoichiometric air/fuel ratio; whereby the output can be improved greatly while securely eliminating knocks.

Preferably, in this case, the total air/fuel ratio is about 12.

Also, the fuel injection amount during the compression stroke is preferably in the order of 60% to 90% with respect to the total fuel injection amount.

Preferably, the internal combustion engine is a multiple-cylinder type internal combustion engine, each cylinder being provided with the fuel injection valve, in which the control means controls the fuel injection valve such that a fuel injection timing of one cylinder during the intake stroke in the specific operation region under the intermediate to high load is prevented from overlapping a fuel injection timing of another cylinder during the compression stroke.

In this configuration, since a fuel injection timing of one cylinder during the intake stroke in the specific operation region under the intermediate to high load is set to be prevented from overlapping a fuel injection timing of another cylinder during the compression stroke, a burden on a driving system (injector driver) of the fuel injection valve can be alleviated, whereby it is unnecessary for the injector driver to be provided as a separate circuit for each fuel injection valve, thus allowing the cost to decrease.

Preferably, the specific operation region is an operation region where the temperature of the engine is at least a predetermined temperature and the engine speed is not higher than a predetermined speed.

In this configuration, since the specific operation region is set to an operation region where the temperature of the engine is at least a predetermined temperature and the engine speed is not higher than a predetermined speed, the combustion optimal for the required operation state can be selected, thus allowing the output and fuel consumption ratio to improve.

In particular, upon starting, a torque required for starting can be secured without knocking, whereby the required output can be secured without knocking, thus allowing a feeling of acceleration to improve. Also, since the starting torque can fully be secured, the idle speed can be set low, thus allowing the fuel consumption ratio upon idling to improve.

Preferably, the engine further comprises fuel property detecting means, and the control means corrects the fuel injection amount during the intake stroke in the specific operation region under the intermediate to high load according to a result detected by the fuel property detecting means.

In this configuration, since the fuel injection amount during the intake stroke in the specific operation region under the intermediate to high load effected by the control means is corrected according to a result detected by the fuel property detecting means, knocks can be prevented from occurring according to the individual fuel property, and a greater output can be obtained, thereby improving fuel consumption ratio as well.

Preferably, the engine further comprises an ignition timing control means for controlling the ignition timing of the engine; wherein the control means has mode selecting means which selects one of a stratified combustion mode for controlling the fuel injection valve such that, when the operation state is in the low load region, fuel is injected during the compression stroke, a divisional stratified combustion mode for controlling the fuel injection valve such that, when the operation state is in the specific operation region, fuel is injected during the intake stroke prior to the fuel injection during the compression stroke by such an amount that the fuel is prevented from self-igniting, and a pre-mixture combustion mode for controlling the fuel injection valve such that, when the operation state is neither in the low load operation region nor in the specific operation region, fuel is injected during the intake stroke to operate the engine; and wherein, when the mode selecting means switches between the divisional stratified combustion mode and an operation mode other than the divisional stratified combustion mode, the ignition timing control means maintains, at least until the fuel injection timing of the fuel injection valve is switched from the combustion mode before switching to the combustion mode after switching, the ignition timing in conformity to the combustion mode before switching to effect control.

In this configuration, since the divisional fuel injection is performed in the specific operation region under the intermediate to high load, such advantages as knocking prevention, increase in output, and contribution to exhaust gas purification can be obtained; while, upon starting in the case where the specific operation state is a low engine speed, a required output can be secured without knocking even upon sudden starting, thus allowing a feeling of acceleration to improve, and a starting torque can be secured sufficiently, whereby the idle speed can be set low, thus allowing the fuel consumption ratio upon idling to improve.

In addition, when the operation modes of the engine are switched, the ignition timing in conformity to the former mode is adopted before the fuel injection states are switched, whereby ignition can be performed with an appropriate timing upon switching the operation modes. Consequently, deterioration of combustion, which is likely to occur due to shifting of ignition timings or the like upon switching the operation modes, can be prevented from occurring, thus allowing an optimal combustion state to be always realized.

In this configuration, in the compression stroke injection mode of the in-cylinder injection internal combustion engine, combustion stability can be secured while accelerating improvement in fuel consumption ratio, whereby improvement in fuel consumption ratio and combustion stability as well as exhaust gas purification can be realized.

BRIEF DESCRIPTION OF THE DRAWINGS

FIG. 11(A) is a chart for explaining ignition timing control in a spark ignition type in-cylinder injection internal combustion engine in accordance with a second embodiment of the present invention, showing an example of states of switching from a divisional injection mode to an intake injection mode;

FIG. 11(B) is a chart for explaining ignition timing control in the spark ignition type in-cylinder injection internal combustion engine in accordance with the second embodiment of the present invention, showing an example of states of switching from the intake injection mode to the divisional injection mode;

DESCRIPTION OF THE PREFERRED EMBODIMENTS

In the following, embodiments of the present invention will be explained with reference to the accompanying drawings, in which FIGS. 1 to 10 show a spark ignition type in-cylinder injection internal combustion engine in accordance with a first embodiment of the present invention, whereas FIGS. 11(A) to 13(C) show a spark ignition type in-cylinder injection internal combustion engine in accordance with a second embodiment of the present invention. The internal engine in each of these embodiments is supposed to be installed in an automobile.

First, the configuration of the spark ignition type in-cylinder injection internal combustion engine (hereinafter also referred to as in-cylinder injection engine) in accordance with the first embodiment will be explained with reference to FIG. 2.

Figure 2:
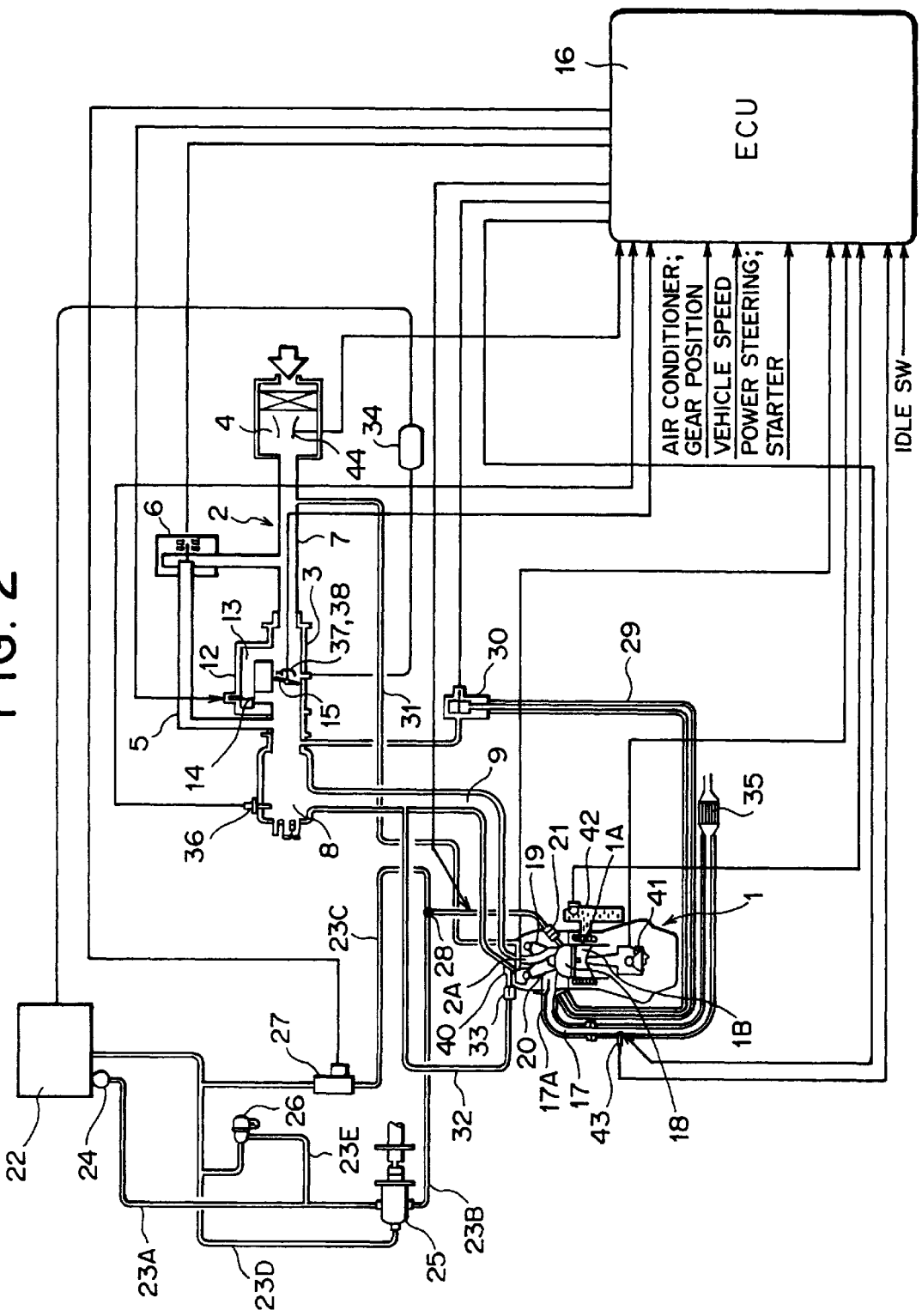
FIG. 2 is a view showing a configuration of the spark ignition type in-cylinder injection internal combustion engine in accordance with the first embodiment of the present invention.

Depicted in FIG. 2 are an engine main body 1, a cylinder 1A, a piston 1B, an intake passage 2, a throttle valve mounting section 3, an air cleaner 4, a bypass passage (second bypass passage) 5, and a second air bypass valve 6 adapted to regulate an amount of air flowing through the bypass passage 5. The intake passage 2 is constituted, successively from the upstream side, by an inlet pipe 7, a surge tank 8, and an intake manifold 9; whereas the bypass passage 5 is disposed upstream the surge tank 8. The bypass valve 6 is adjusted to a desired opening angle by a stepping motor, or its opening angle is controlled by a solenoid valve, which is duty-controlled.

Numeral 12 refers to an idle speed control functional section constituted by a bypass passage (first bypass passage) 13 and a first air bypass valve 14 as a bypass valve. The first air bypass valve 14 is driven, for example, by a non-depicted stepping motor. Numeral 15 refers to a throttle valve. The first bypass passage 13 and the second bypass passage 5 are connected to the intake passage 2, respectively, by their upstream and downstream ends, while bypassing the portion of the intake passage 2, to which the throttle valve 15 is attached.

Opening/closing control of each of the second air bypass valve 6 and the first air bypass valve 14 is performed via an electronic control unit (ECU) 16.

Also provided are an exhaust passage 17 and a combustion chamber 18. Opening portions of the intake passage 2 and the exhaust passage 17 with respect to the combustion chamber 18, i.e., an intake port 2A and an exhaust port 17A, are respectively equipped with an intake valve 19 and an exhaust valve 20.

Numeral 21 refers to a fuel injection valve (injector), which is disposed in this engine to directly inject fuel into the combustion chamber 18.

Further provided are a fuel tank 22, fuel supply paths 23A to 23E, a low-pressure fuel pump (electric pump) 24, a high-pressure fuel pump (engine-driven pump) 25, a low-pressure regulator 26, a high-pressure regulator 27, and a delivery pipe 28; whereby fuel within the fuel tank 22 is driven by the low-pressure fuel pump 24 and is further pressurized by the high-pressures fuel pump 25, which is operated directly in synchronization with the engine operation, so as to be supplied, in a predetermined high-pressure state, to the injector 21 through the fuel supply paths 23A and 23B and the delivery pipe 28. Here, the fuel pressure emitted from the low-pressure fuel pump 24 is adjusted by the low-pressure regulator 26, whereas the fuel pressure pressurized by the high-pressure fuel pump 25, to be guided to the delivery pipe 28, is adjusted by the high-pressure regulator 27.

Also provided are an exhaust gas recirculation passage (EGR passage) 29 for recirculating the exhaust gas within the exhaust passage 17 of the engine 1 into the intake passage 2, a stepping motor type valve (EGR valve) 30 for adjusting the amount of recirculation of exhaust gas flowing into the intake passage 2 through the EGR passage 29, a flow path 31 for returning blow-by gas, a passage 32 for positive crankcase ventilation, a valve 33 for positive crankcase ventilation, a canister 34, and an exhaust gas purifying catalyst is used 35 (lean No$_x$ catalyst here).

As shown in FIG. 2, since the ECU 16 controls not only the first and second air bypass valves 14 and 6 but also the injector 21, an ignition coil for a spark plug 45 (see FIG. 1), and the EGR valve, and performs fuel pressure control by the high-pressure regulator 27; connected to the ECU 16 are an airflow sensor 44, an intake temperature sensor 36, a throttle position sensor (TPS) 37 for detecting the throttle opening degree, an idle switch 38, an air conditioner switch (not depicted), a gear position sensor (not depicted), a vehicle speed sensor (not depicted), a power steering switch (not depicted) for detecting the operation state of power steering, a starter switch (not depicted), a first cylinder sensor 40, a crank angle sensor 41, a water temperature sensor 42 for detecting the temperature of cooling water for the engine, an O$_2$ sensor 43 for detecting the oxygen concentration in exhaust gas, and the like. Also provided within the ECU 16 is a function for computing an engine speed according to the crank angle sensor 41. While the crank angle sensor 41 and this engine speed computing function constitute an engine speed sensor, the crank angle sensor 41 is also referred to as engine speed sensor here for convenience.

In the following, details of control concerning the engine through the ECU 16 will be explained with reference to FIG. 1.

This engine switches, according to its operation state, between pre-mixture burn operation which can be established by uniformly injecting fuel into the fuel combustion chamber 18 and a stratified burn operation, which can be established by concentrating the injected fuel around the spark plug 45 facing the combustion chamber 18.

This engine sets, as engine operation modes, a stratified combustion mode, in which the above-mentioned stratified burn operation is performed by injecting fuel at a compression stroke, and a pre-mixture combustion mode in which the above-mentioned pre-mixture burn operation is performed by mainly injecting fuel at an intake stroke.

Further provided, as a part of the stratified combustion mode, is an ultra-lean operation mode (compressed lean operation mode), in which operation (ultra-lean burn operation) is performed by stratified combustion in a state where fuel is very lean (i.e., the air/fuel ratio is much higher than the stoichiometric air/fuel ratio).

Also provided, as a part of the pre-mixture combustion mode, is a lean operation mode (intake lean operation mode) for performing an operation in a state where fuel is lean (i.e., higher than the stoichiometric air/fuel ratio) but richer than that in the ultra-lean mode, a stoichiometric operation mode (stoichiometric feedback operation mode) for performing feedback control based on information from the O$_2$ sensor or the like so that the air/fuel ratio becomes the stoichiometric air/fuel ratio, and an enriched operation mode (open-loop mode) for performing an operation in a state where fuel is rich (i.e., the air/fuel ratio is lower than the stoichiometric air/fuel ratio).

In the compressed lean operation mode, the leanest combustion (where the air/fuel ratio is on the order of 30 to 40 or higher) can be realized. In this mode, fuel injection is performed at a step very close to the ignition timing such as a later stage of the compression stroke, and fuel is concentrated in the vicinity of the spark plug to be partially enriched while being kept lean as a whole, whereby economical operation can be performed while ignitability and combustion stability are secured.

The intake lean operation mode can also realize lean combustion (where the air/fuel ratio is on the order of 20 to 24). In this mode, fuel injection is performed at the intake stroke earlier than that performed in the compressed lean operation mode, so that fuel is diffused within the combustion chamber, thus making the overall air/fuel ratio lean. Consequently, economical operation can be performed while ignitability and combustion stability are secured.

In the stoichiometric operation mode, a sufficient engine output can efficiently be obtained according to the output of the O$_2$ sensor while the air/fuel ratio is kept at the stoichiometric state or in the vicinity thereof.

In the open-loop burn operation mode, burn operation is performed at the stoichiometric air/fuel ratio or an (enriched) air/fuel ratio richer than that by open-loop control in order to obtain sufficient output upon acceleration or starting.

This internal combustion engine includes, in addition to these modes, a divisional injection enriched mode (hereinafter referred to as divisional injection mode), which is a characteristic feature of the present invention. This divisional injection mode, in which fuel injection is divisionally performed at the intake stroke and compressed stroke and, in particular, combustion is performed mainly by stratified combustion of the fuel injected at the compression stroke, is included in the stratified combustion mode.

In this divisional injection mode, the fuel injection amount is set such that a fuel-rich air/fuel mixture (i.e., air/fuel mixture having a total air/fuel ratio lower than the stoichiometric air/fuel ratio) is formed by the total injection amount of the intake stroke injection and compression stroke injection. While the compression stroke injection is performed after the intake stroke injection, knocking occurs when the fuel supplied into the cylinder by the intake stroke injection is self-ignited. Consequently, in the intake stroke injection, fuel injection is performed by such an amount that the fuel concentration becomes lean, in order to prevent the injected fuel from self-igniting.

Figure 14:
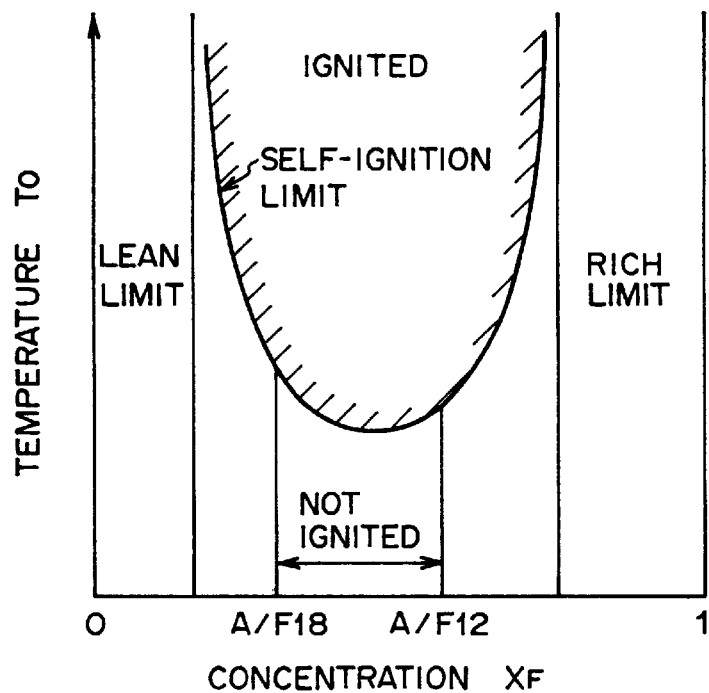
FIG. 14(A) is a chart showing a typical knocking generation characteristic (self-ignition limit) with respect to air/fuel mixture concentration and temperature.
FIG. 14(B) is a chart showing a typical knocking generation characteristic (self-ignition limit) with respect to temperature and pressure.
Figure 14:
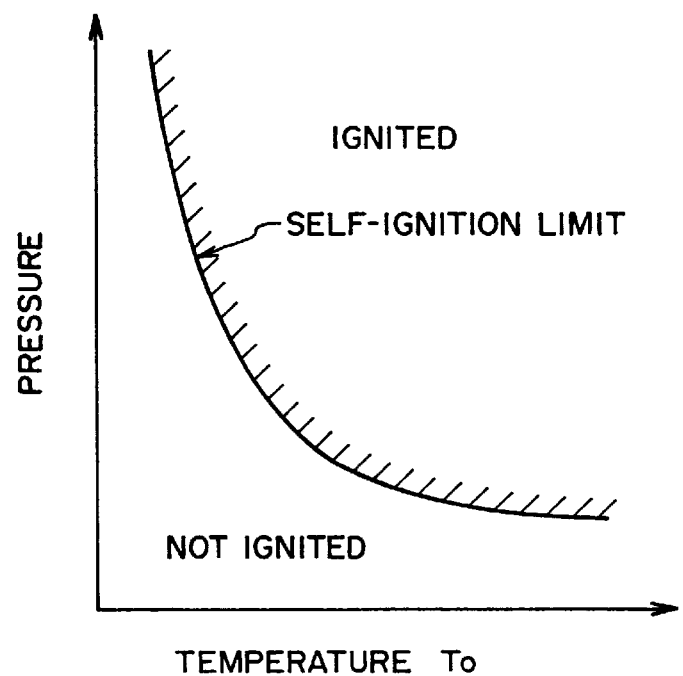
Figure 15:
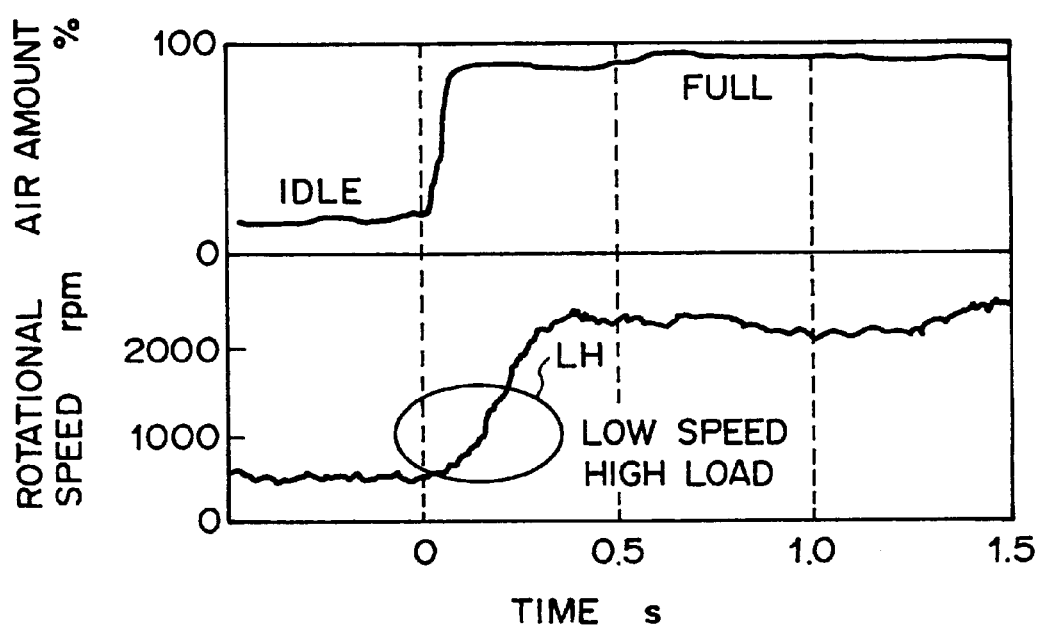
FIG. 15 is a chart for explaining a low-rotation and high-load state upon starting in a vehicle having a conventional spark ignition type in-cylinder injection internal combustion engine.

Namely, as shown in the above-mentioned FIG. 14(A), fuel is likely to self-ignite when the air/fuel ration A/F is in the order of 18 to 12 in the vicinity of the stoichiometric air/fuel ratio, for example; and fuel is less likely to self-ignite as the fuel concentration in the air/fuel mixture deviates from the stoichiometric air/fuel ratio. In order to adopt fumigation, it is necessary for fuel to be mixed into the intake air to such an extent that the air/fuel mixture does not self-ignite, while the fuel is being atomized or vaporized. To this end, in the intake stroke injection, an air/fuel mixture having a very lean fuel concentration (in which the air/fuel ratio A/F is much higher than the stoichiometric air/fuel ratio) is formed.

Here, at the time of the intake stroke injection, fuel injection is performed with an injection amount set such that the air/fuel ratio becomes on the order of 30 to 60.

On the other hand, at the time of the compression stroke injection, fuel injection is performed by setting an injection amount corresponding to an air/fuel ratio in the order of 15 to 20, so that a fuel-rich air/fuel mixture, i.e., an air/fuel mixture having an air/fuel ratio of about 12, can be formed by the total injection amount of the compression stroke injection and intake stroke injection.

Namely, in the case where the air/fuel ratio at the time of the intake stroke injection is about 60, when fuel injection is performed by a fuel injection amount corresponding to an air/fuel ratio of about 15, the total air/fuel ratio corresponding to the total injection amount can be set to about 12 (i.e., 1/12=1/60+1/15). In the case where the air/fuel ratio at the time of the intake stroke injection is about 30, when fuel injection is performed by a fuel injection amount corresponding to an air/fuel ratio of about 20, the total air/fuel ratio corresponding to the total injection amount can be set to about 12 (i.e., 1/12=1/30+1/20).

Among these various operation modes, one mode is selected to control the engine operation. This operation mode is selected according to a map, such as that shown in FIG. 3, in response to engine speed Ne and effective pressure Pe indicating a state of load.

In addition to the above-mentioned operation modes, a fuel cut mode for stopping (cutting) fuel injection is provided. The fuel cut mode is not explained here, since it is a mode under a particular condition and is performed in order to prevent the engine rotational speed from exceeding its upper limit, temporarily save the fuel consumption at the time when the throttle valve is closed, keep HC from being discharged in excess to prevent the catalyst from being heated too much, and so forth.

Figure 3:
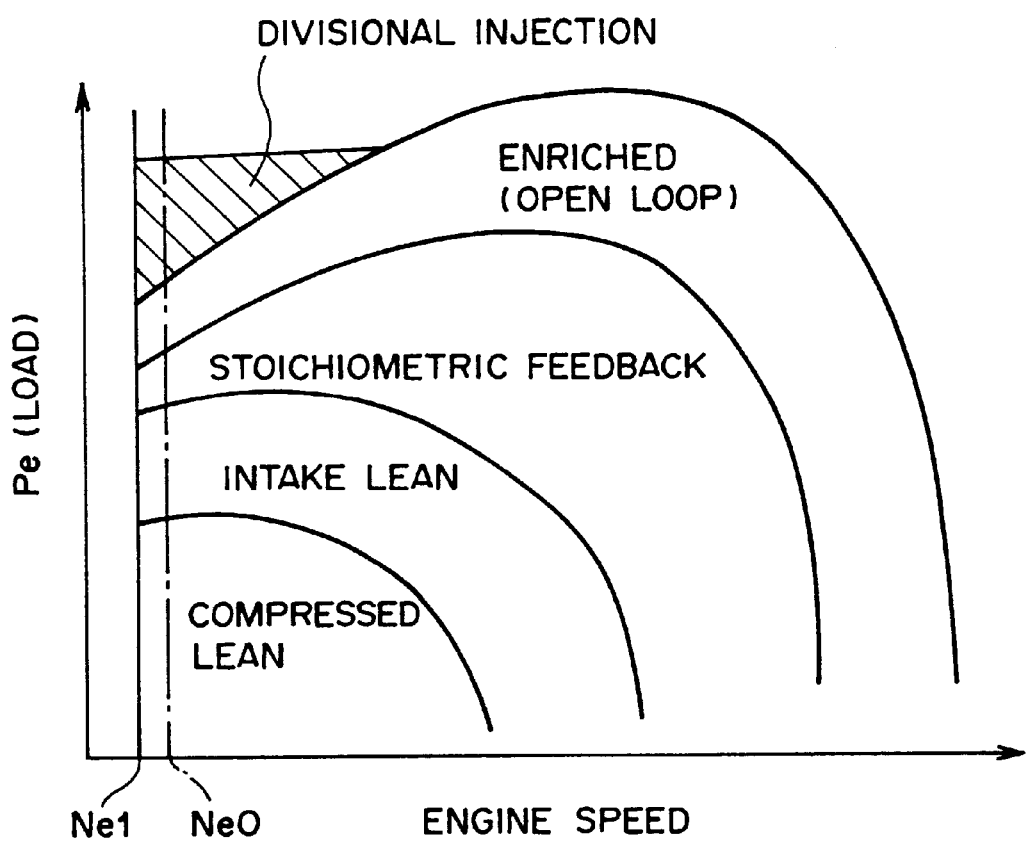
FIG. 3 is a view (map) for explaining operation modes in the spark ignition type in-cylinder injection internal combustion engine in accordance with the first embodiment of the present invention.

As shown in FIG. 3, in the case where both engine speed Ne and load Pe are low, the ultra-lean operation mode (compressed lean operation mode) is selected. As the engine speed Ne and load Pe become higher, the lean operation mode (intake lean operation mode), stoichiometric operation mode (stoichiometric feedback operation mode), and enriched operation mode (open-loop mode) are successively selected.

As shown in FIG. 3, though the enriched operation mode responds to high load most favorably, the load to which the enriched operation mode can respond becomes lower in the lower engine speed region as well. The divisional injection mode is selected at a low-speed and high-load region of the engine which cannot be responded by the enriched operation mode.

The divisional injection mode region can thus be set to the low-speed and high-load region of the engine since a high engine output can be obtained in the divisional injection mode operation even when the engine speed is low. The burn phenomenon at the time of divisional injection, which has been experimentally confirmed, is supposed to yield a high output as follows.

Namely, upon this divisional injection, at its compressed injection timing, within the combustion chamber where a fuel-lean air/fuel mixture (whose air/fuel ratio A/F=30 to 60) formed by the intake stroke injection beforehand has been distributed, an air/fuel mixture with a partially high fuel concentration formed by the compression stroke injection (an air/fuel mixture having a high fuel concentration due to the fact that fuel corresponding to a total air/fuel ratio A/F=15 to 20 is injected into the cavity) flows into the vicinity of the spark plug 45 as a stratified flow.

Here, the air/fuel mixture formed by the intake stroke injection is sufficiently lean so that it cannot self-ignite. The rich air/fuel fixture formed as a stratified flow by the compression stroke injection cannot self-ignite either since it does not have enough time to proceed with a pre-reaction for knocking before ignition is effected by the spark plug 45 thereafter. Accordingly, without causing fuel to self-ignite, the spark plug 45 effects ignition.

Figure 4A:
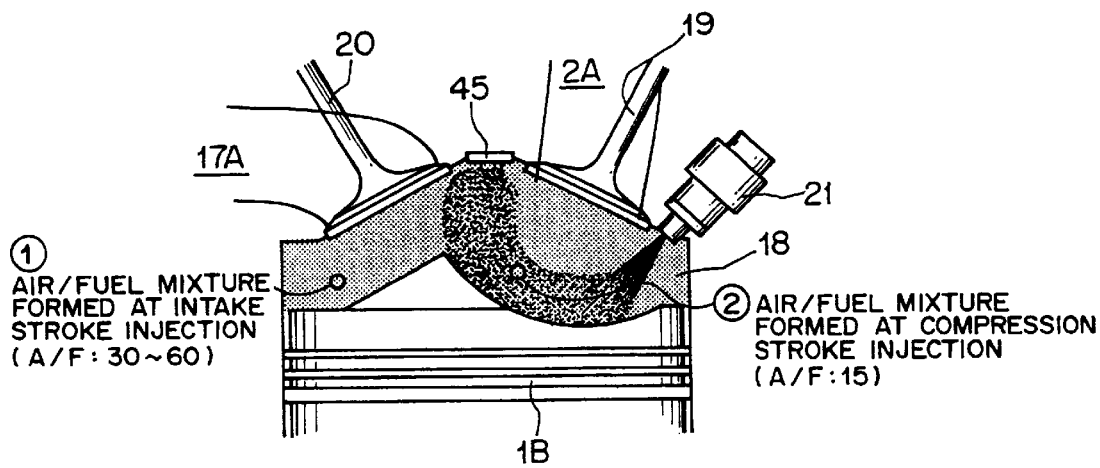
FIG. 4(A) is a main sectional view for explaining a principle of combustion based on divisional injection in the spark ignition type in-cylinder injection internal combustion engine in accordance with the first embodiment of the present invention, showing a state of the engine at the compression injection timing.
Figure 4B:
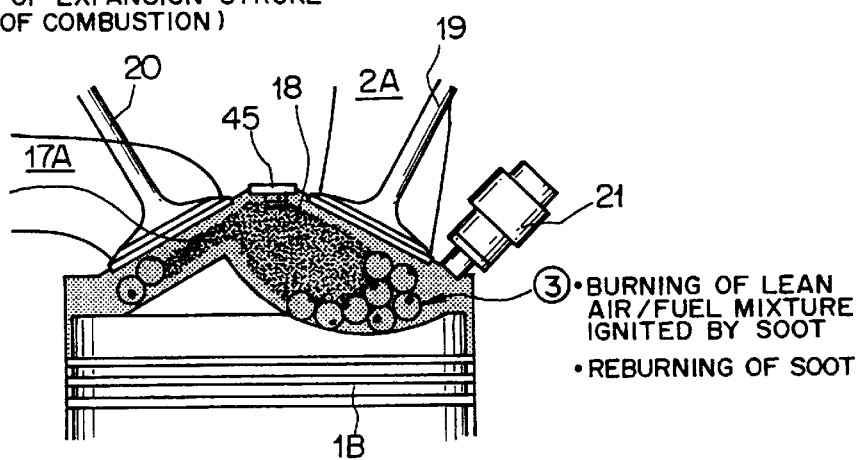
FIG. 4(B) is a main sectional view for explaining a principle of combustion based on divisional injection in the spark ignition type in-cylinder injection internal combustion engine in accordance with the first embodiment of the present invention, showing a state of the engine at the later stage of combustion after ignition.
Figure 5:
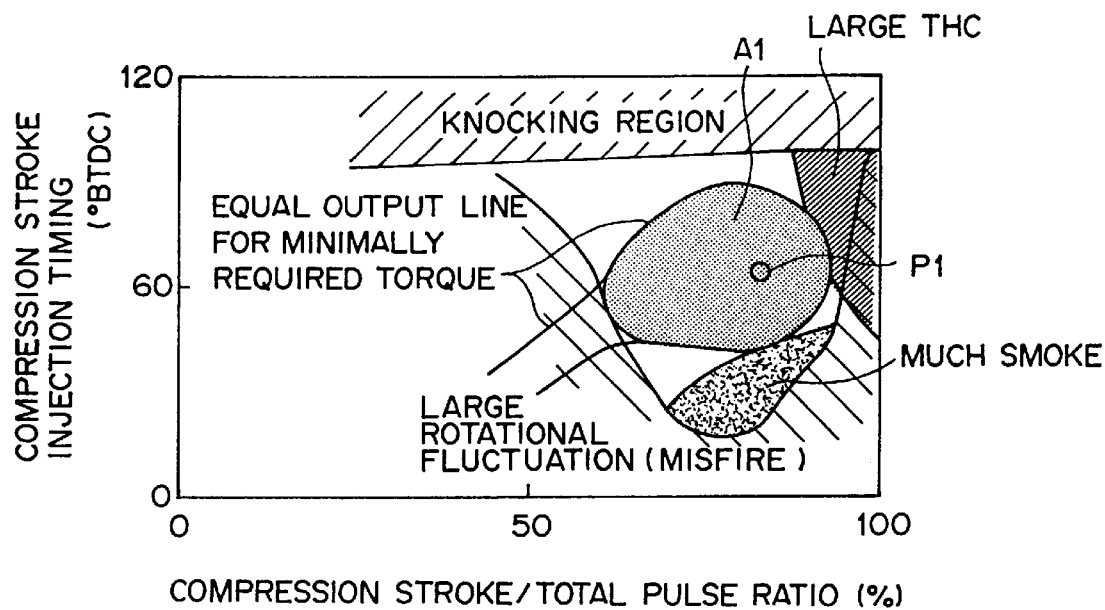
FIG. 5(A) is a chart showing an example for setting a compression stroke injection of divisional injection and its resulting effect in the spark ignition type in-cylinder injection internal combustion engine in accordance with the first embodiment of the present invention, for explaining the ratio of compression stroke injection and fuel injection timing.
FIG. 5(B) is a chart showing the above-mentioned example for setting a compression stroke injection of divisional injection and its resulting effect in the spark ignition type in-cylinder injection internal combustion engine in accordance with the first embodiment of the present invention, indicating a characteristic of improving knocking limit output by the divisional injection.
Figure 5:
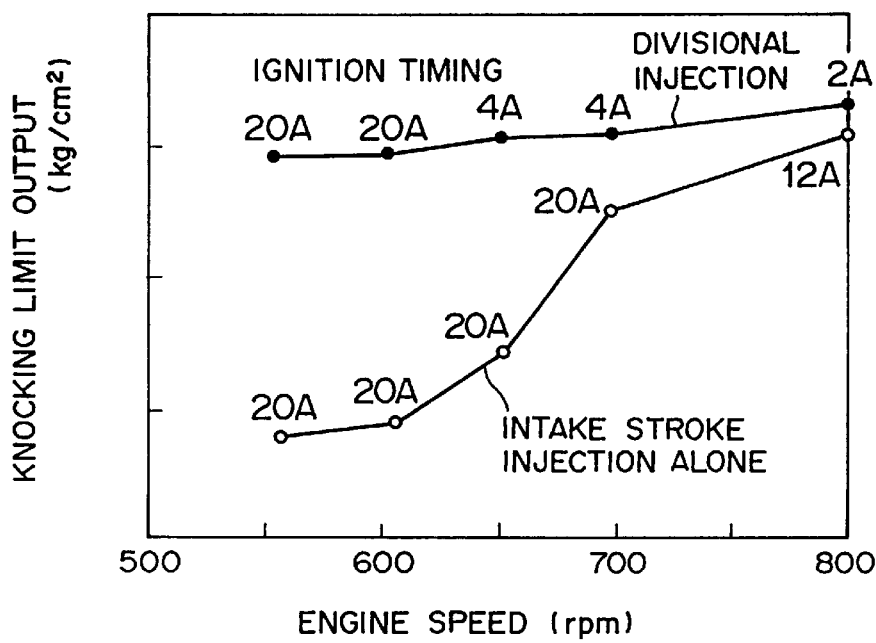
Figure 6:
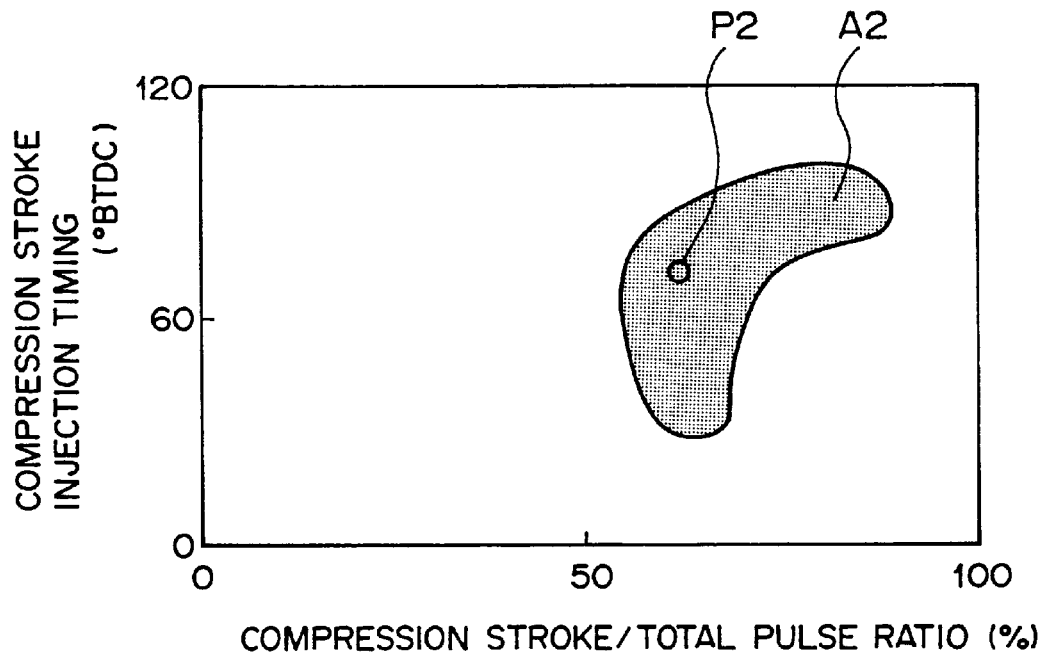
FIG. 6(A) is a chart showing another example for setting a compression stroke injection of divisional injection and its resulting effect in the spark ignition type in-cylinder injection internal combustion engine in accordance with the first embodiment of the present invention, for explaining the ratio of compression stroke injection and fuel injection timing.
FIG. 6(B) is a chart showing the above-mentioned another example for setting a compression stroke injection of divisional injection and its resulting effect in the spark ignition type in-cylinder injection internal combustion engine in accordance with the first embodiment of the present invention, indicating a characteristic of improving knocking limit output by the divisional injection.
Figure 6:
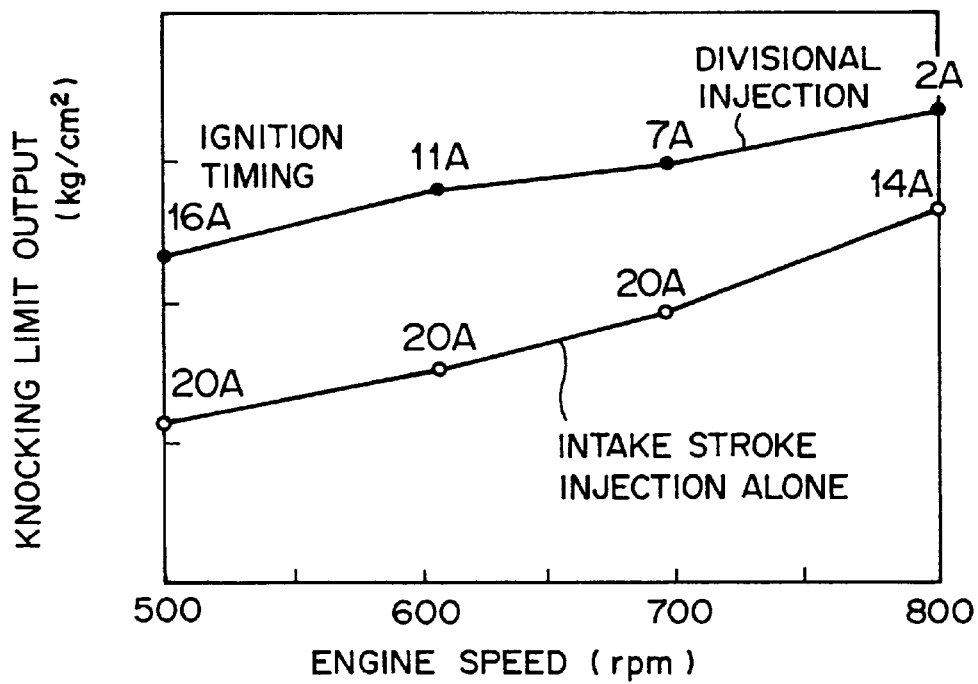
Figure 7:
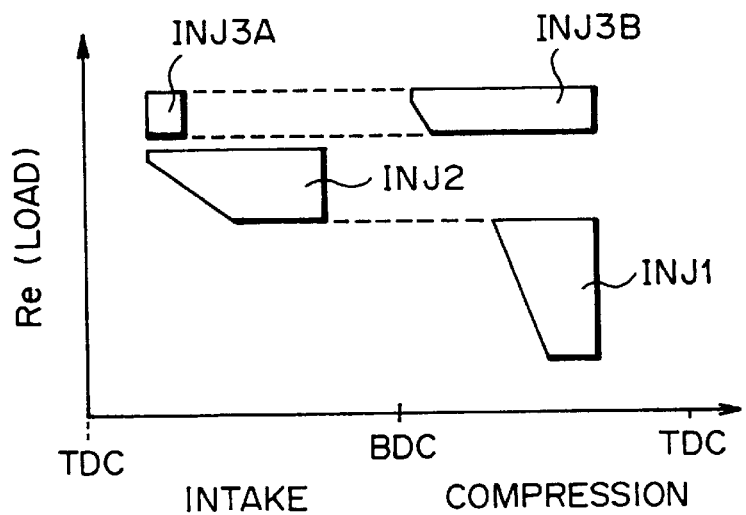
FIG. 7(A) is a view for explaining a fuel injection characteristic including divisional injection in the spark ignition type in-cylinder injection internal combustion engine in accordance with the first embodiment of the present invention.
FIG. 7(B) is a view for explaining a fuel injection characteristic including divisional injection in a modified example of the spark ignition type in-cylinder injection internal combustion engine in accordance with the first embodiment of the present invention.
Figure 7:
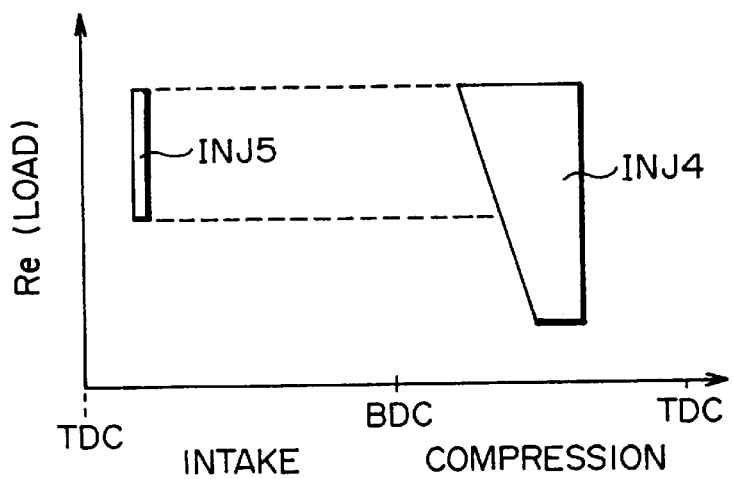

Consequently, the rich air/fuel mixture in the vicinity of the spark plug 45 is initially ignited, whereby the stratified flow of rich air/fuel mixture begins to burn. Upon burning, this enriched air/fuel mixture lacks air, thus generating a large amount of soot. As shown in FIG. 4(B), it is supposed that the lean air/fuel mixture formed by the intake stroke injection is burned as being ignited by thus generated soot.

Namely, due to the lean air/fuel mixture formed by the intake stroke injection, the excess air surrounding the stratified rich air/fuel mixture formed in the compression stroke injection can be utilized effectively, thus allowing the combustion energy to fully increase and a high output to yield. Also, it is possible to greatly suppress generation of soot, which may become problematic when a relatively rich air/fuel mixture is burned in the stratified combustion effected by the compression stroke injection.

The divisional injection mode includes an inhibition region. Here, the inhibition region is set to an area where engine cooling water temperature (which may be not only the cooling water temperature but also any detectable parameter concerning the engine temperature, the easily detectable cooling water temperature being selected here) is not higher than a predetermined temperature (e.g., −10° C.).

This is due to the fact that atomization of fuel may be deteriorated when the engine temperature is low, and a fumigation condition may not be satisfied when the fuel injected at the intake stroke is hard to atomize, thus failing to yield antiknock effects.

In the following, how to set the ratio of injection amount and injection timing for the compression stroke injection in such divisional injection mode will be explained with reference to FIGS. 5(A), 5(B), 6(A), and 6(B).

A pair of FIGS. 5(A) and 5(B) and a pair of FIGS. 6(A) and 6(B), respectively, show examples of characteristics in spark ignition type in-cylinder injection internal combustion engines whose specifications are different from each other. FIGS. 5(A) and 6(A) explain how to set the injection amount ratio (compression stroke injection pulse/total injection pulse) and injection timing of the compression stroke injection under a condition where engine speed Ne is 600 rpm, ignition timing is 20° ATDC (at a crank angle of 20° after top dead center), intake stroke injection timing is 280° BTDC (at a crank angle of 280° before top dead center), and total air/fuel ratio is 12; whereas FIGS. 5(B) and 6(B) indicate knocking limit output characteristics respectively obtained by the settings shown in FIGS. 5(A) and 6(A).

First, explanation will be based on FIGS. 5(A) and 5(B). As shown in FIG. 5(A), when the timing for compression stroke injection is advanced, a pre-reaction for knocking proceeds, thus yielding a knocking region. As the ratio of the compression stroke injection amount to the former injection amount is made higher, the total HC (THC), i.e., total amount of hydrocarbon, becomes larger. As the compression stroke injection timing is retarded and the ratio of compression stroke injection amount is made higher, a larger amount of smoke is generated. Also, in response to the compression stroke injection timing and compression stroke injection amount ratio, there exists a region, as depicted, where rotation greatly fluctuates, resulting in misfire. Further, according to the compression stroke injection timing and compressor stroke injection amount ratio, there exists, as a depicted curve, an equal output line for minimally required torque.

In view of these various conditions, on the major premise that no knock will be generated (i.e., it will not be in the knocking region) and that no misfire will occur (i.e., it will not be in the misfire region), a divisional injection area A1, depicted as a halftone in FIG. 5(A), exists as a region where THC is not too much but a minimally required torque can be obtained.

Though the area A1 is mainly defined by the equal output line for the minimally required torque here, requirements for defining the area A1 may differ, even in the same engine, depending on the setting of limit levels concerning THC and smoke generation. Also, even in the same engine, requirements for defining the area A1 may differ according to different operation conditions.

Further, in the case where engine specifications differ from each other, even when operation conditions are the same and individual defining conditions are the same (neither knock nor misfire occurs, limit levels for THC and smoke generation are the same, and minimally required torque levels are the same); like an area A2 shown in FIG. 6(A) as a halftone in FIG. 6(A), the divisional injection area A2 differs from the area A1 shown in FIG. 5(A).

Within these divisional injection areas A1 and A2, points P1 and P2, which satisfy the individual defining conditions with the most favorable balance, are indicated in FIGS. 5(A) and 6(A) as circles.

As indicated by the areas A1 and A2 in FIGS. 5(A) and 6(A), an area suitable for performing divisional injection exists where the compression stroke injection timing is in the order of 30° to 100° BTDC and the ratio of compression stroke injection amount is in the order of 60% to 90%. Though such a numeric range can be set as a divisional injection area in these two engines, for example, the divisional injection area may deviate depending on changes in engine characteristics, operation condition, and area-defining conditions. Such numeric setting, in which the compression stroke injection timing is in the order of 30° to 100° BTDC and the ratio of compression stroke injection amount is in the order of 60% to 90%, should be regarded as a rough standard for setting values. Hence, it is preferred that setting be made according to individual engine characteristics, operation conditions, and area-defining conditions.

When the compression stroke injection is performed under the conditions of points P1 and P2 in the divisional injection areas A1 and A2, as compared with the case (enriched operation mode) with the same air/fuel ratio (=12) where fuel injection is performed only at the intake stroke, knocking limit output is greatly improved as respectively shown in FIGS. 5(B) and 6(B). Here, the knocking limit output is obtained when the injection timing is advanced within a range where no knocking occurs.

As depicted, in the case where fuel is injected only in the intake stroke, knocking may occur in a low engine speed region unless the ignition timing is greatly retarded to 20A ("A" indicating "° ATDC (crank angle after top dead center)"), 14A, or 12A. In the divisional injection, by contrast, though the ignition timing is set to 20A or 16A in a region where the engine speed is very low, it can be successively advanced to 11A, 7A, 4A, and 2A in higher speed regions. As being facilitated by such advance in ignition timing as well, the knocking limit output greatly improves.

Here, in the low engine speed region where such divisional injection is performed, the engine operation modes are switched according to states of load, as shown in FIG. 3, such that the compressed lean operation mode is selected under low load, the intake lean operation mode, stoichiometric operation mode, and open loop mode are selected under intermediate load, and the divisional injection mode is selected under high load. Accordingly, fuel injection characteristics of an engine in a certain low speed region can schematically be depicted as shown in FIGS. 7(A) and 7(B), for example.

Here, FIG. 7(A) relates to this embodiment, whereas FIG. 7(B) refers to a modified example thereof. First, explanation will be based on FIG. 7(A).

Under a low load operation of the engine (where Pe is low), the compressed lean operation mode is selected. Consequently, as indicated by an area INJ1 in FIG. 7(A), the fuel injection starting timing is advanced, as load becomes higher, to increase the fuel injection period (and consequently the fuel injection amount) in response to the rise in load, while a certain point of time (optimal time) in the compression stroke is adopted as the fuel injection terminating timing.

Upon an intermediate to high load operation of the engine (where Pe is intermediate to high), the intake lean operation mode, stoichiometric operation mode, and open-loop mode are selected according to states of load. In these modes, since fuel injection is performed at the intake stroke; as indicated by an area INJ2 in FIG. 7(A), the fuel injection starting timing is advanced, as load becomes higher, to increase the fuel injection period (and consequently the fuel injection amount) in response to the rise in load, while a certain point of time (optimal time) in the intake stroke is adopted as the fuel injection terminating timing.

Upon a very high load operation of the engine (where Pe is particularly high), the divisional injection mode is selected, so that fuel injection is divisionally performed at the intake stroke, as indicated by an area INJ3A in FIG. 7(A), and at the compression stroke, as indicated by an area INJ3B in FIG. 7(A). Also in this case, the respective terminating timings for the injections INJ3A and INJ3B are set to predetermined optimal points of time, whereas the fuel injection period (fuel injection amount), corresponding to the state of load, is adjusted as the fuel injection starting timing is changed.

In this divisional injection mode, the fuel injection amount is adjusted by the compression stroke injection INJ3B, whereas the intake stroke injection INJ3A is set so as to attain a constant fuel injection amount, i.e., a constant fuel injection starting timing as well as a constant fuel injection terminating timing. Of course, the fuel injection amount is adjusted by advancing the fuel injection starting timing of the compression stroke injection INJ3B in response to the rise in load.

The fuel injection amount (total injection period) is thus adjusted by the compression stroke injection INJ3B alone due to the fact that, as mentioned above, it is necessary for the intake stroke injection INJ3A to be performed by such an amount that the fuel concentration becomes so lean as to prevent the injected fuel from self-igniting. Thus, the total fuel injection amount is mainly occupied by the injection amount of the compression stroke injection INJ3B, whereby the fuel amount can fully be adjusted by the compression stroke injection INJ3B alone. Accordingly, control is simplified as the fuel amount in the intake stroke injection is kept constant.

Here, as shown in FIG. 7(B), in the case where such an engine is rotated at a low speed, the compressed lean operation mode and divisional injection mode may be selected, respectively, upon a low load operation and an intermediate to high load operation.

Namely, upon the low-load operation of the engine (where Pe is low), the compressed lean operation mode is selected. Consequently, as indicated by an area INJ4 in FIG. 7(B), the fuel injection starting timing is advanced, as load becomes higher, to increase the fuel injection period (and consequently the fuel injection amount) in response to the rise in load, while a certain point of time (optimal time) in the compression stroke is adopted as the fuel injection terminating timing.

Upon the intermediate to high load operation of the engine (where Pe is intermediate to high), the divisional injection mode is selected, so that, in addition to the compression stroke injection indicated by the area INJ4 in FIG. 7(B), an intake stroke injection indicated by an area INJ5 in FIG. 7(B) is performed. Also in this case, the respective terminating timings for the injections INJ4 and INJ5 are set to predetermined optimal points of time, whereas the fuel injection period (fuel injection amount), corresponding to the state of load, is adjusted as the fuel injection starting timing of the compression stroke injection INJ4 is changed alone.

In this spark ignition type in-cylinder injection internal combustion engine, one mode is selected from the above-mentioned various engine operation modes. Such selection is effected according to engine operation state, i.e., engine load state Pe and engine speed Ne. Also, in each mode, fuel injection control, i.e., injection control of the fuel injection valve (injector) 21, and ignition timing control, i.e., drive control of the spark plug 45, are performed on the basis of engine operation state such as engine load state Pe and engine speed Ne.

Figure 1:
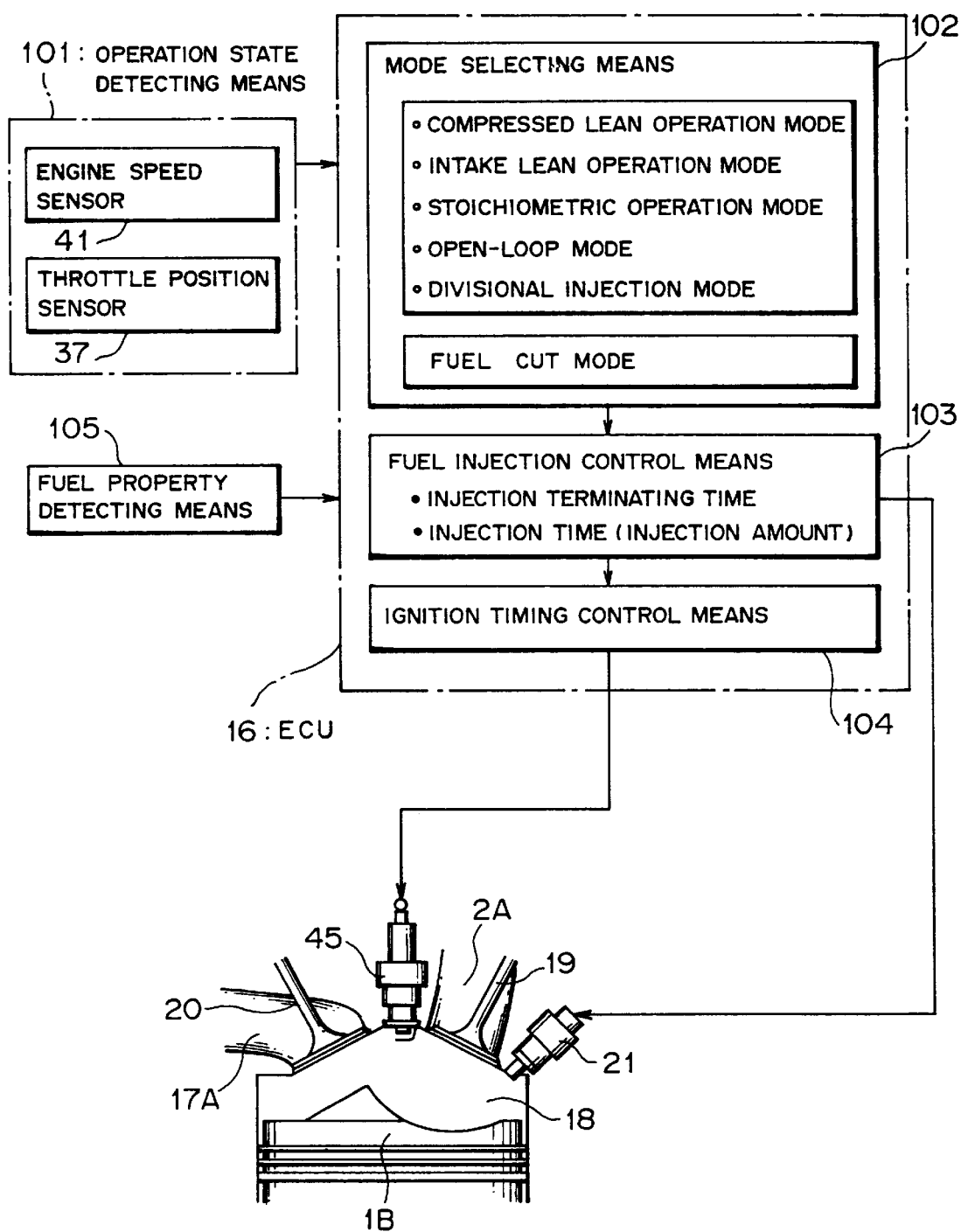
FIG. 1 is a schematic block diagram showing a configuration of main parts of a spark ignition type in-cylinder injection internal combustion engine in accordance with a first embodiment of the present invention.

To this end, as shown in FIG. 1, the spark ignition type in-cylinder injection internal combustion engine is provided with an operation state detecting means 101 for detecting an engine operation state, and thus detected engine operation state information is fed into the ECU 16. Further provided is a fuel property detecting means 105 for detecting the property of fuel (i.e., fuel property such as octane number in the case of gasoline), and thus detected fuel property information is fed into the ECU 16 as well.

The ECU 16 comprises a mode selecting means 102 for selecting an operation mode according to the engine operation information and data (engine load state Pe and engine speed Ne) computed on the basis of the engine operation information, a fuel injection control means 103 for setting a fuel injection timing (fuel injection terminating timing and fuel injection starting timing) on the basis of the operation mode selected by the mode selecting means 102 and the above-mentioned data (load Pe and speed Ne) to control driving of the injector 21, and an ignition timing control means 104 for setting a fuel ignition timing on the basis of the operation mode selected by the mode selecting means 102 and the above-mentioned data (load Pe and speed Ne) to control driving of the spark plug 45.

Since the engine load state Pe is computed on the basis of engine speed Ne and throttle opening degree θth, engine operation state data fed into the ECU 16 are the engine speed Ne and the throttle opening degree θth, and the operation state detecting means 101 comprises the engine speed sensor 41 and the throttle position sensor 37.

Specifically, from the throttle opening degree θth detected by the throttle position sensor 37 and the engine speed sensor Ne based on the output of an accelerator position sensor and information detected by the crank angle sensor, a target engine load (target effective pressure) Pe is set according to a map.

Further, the target Pe is corrected according to whether the air conditioner is on or off, power steering is on or off, and so forth. From the corrected target Pe thus obtained and the engine speed Ne, the mode selection by the mode selecting means 102, the fuel injection control by the fuel injection control means 103, the ignition control by the ignition timing control means 104, the air bypass valve control, and the like are performed.

In the mode selection by the mode selecting means 102, a mode is selected from a map such as that shown in FIG. 3 according to the target Pe and engine speed Ne, whereas such a map is selected from a plurality of maps according to a fuel property. Consequently, an appropriate operation mode can be selected according to the fuel property.

Also, in order for the fuel injection control means 103 to control fuel injection, it is necessary to set the injection starting timing and injection terminating timing. Here, as mentioned above, the injector driving time and the injection terminating timing of the injector are set and, while the injection starting timing is counted backward based on thus set time and timing, the driving timing of the injector is determined.

Namely, in order to set the injector driving time, the air/fuel ratio A/F is initially set according to a map or the like on the basis of the target Pe and engine speed Ne. The setting map in this case is set for each mode, and the one corresponding to the engine operation state is selectively used.

From thus obtained air/fuel ratio A/F and an intake amount Qpb detected by the air flow sensor, an injector driving time Tinj is computed. In this engine, the injector driving time Tinj is corrected not only in terms of unequal injector ratios among cylinders and dead times among cylinders, but also (as fuel property correction) in response to the fuel property information detected by the fuel property detecting means 105.

The injection terminating period in the injector is also set according to a map on the basis of the target Pe and engine speed Ne. The setting map in this case is also provided for each mode, and the one corresponding to the engine operation state is selectively used.

In the compressed lean operation mode, thus obtained injection terminating period is corrected in terms of water temperature. The injector is driven according to such injector driving time Tinj and injection terminating timing.

Also, with respect to the ignition timing control by the ignition timing control means 104, i.e., ignition timing control of the spark plug by the ignition coil, the ignition timing is set according to a map on the basis of the target Pe and engine speed Ne. The setting map in this case is also provided for each mode, and the one corresponding to the engine operation state is selectively used.

In this engine, thus obtained ignition timing is subjected to not only various retarding corrections but also a correction (fuel property correction) according to the fuel property information detected by the fuel property detecting means 105, and the ignition coil is controlled on the basis of this corrected timing.

With respect to the air bypass control, the valve opening control amounts of the air bypass valves 14 and 6 are initially set so that a required air amount (or target intake air amount) Q is obtained according to a map on the basis of the target Pe and engine speed Ne. In order to set the valve opening control amounts, a map corresponding to the engine operation mode is selectively used from a plurality of maps, and a signal is appropriately outputted in response to the engine operation mode. When an idle operation state is established, a valve opening control amount (mainly the control amount of the air bypass valve 14) concerning a required air amount (or target intake air amount) based on the engine speed feedback is set. In response to thus obtained valve opening control amount, the second air bypass valve 6 and the first air bypass valve 14 are controlled so as to attain desired states.

With respect to the flow control of EGR, the flow rate of EGR is set according to a map on the basis of the target Pe and engine speed Ne. The setting map in this case is also provided for each mode (the later lean operation mode and the stoichiometric feedback operation mode), and thus obtained flow rate of EGR is corrected in terms of water temperature, and the flow rate control of EGR is performed.

Figure 8:
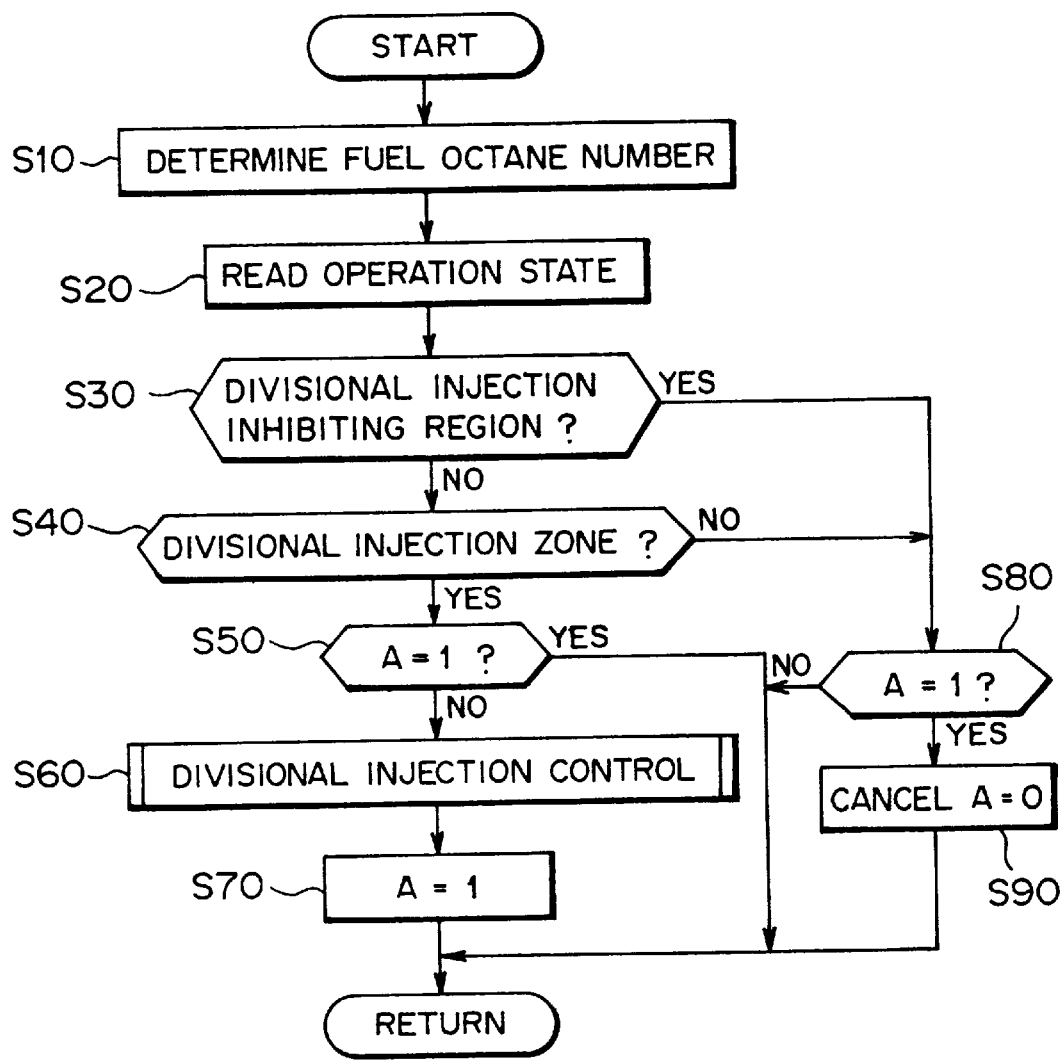
FIG. 8 is a flowchart for explaining divisional injection control in the spark iginition type in-cylinder injection internal combustion engine in accordance with the first embodiment of the present invention.
Figure 9:
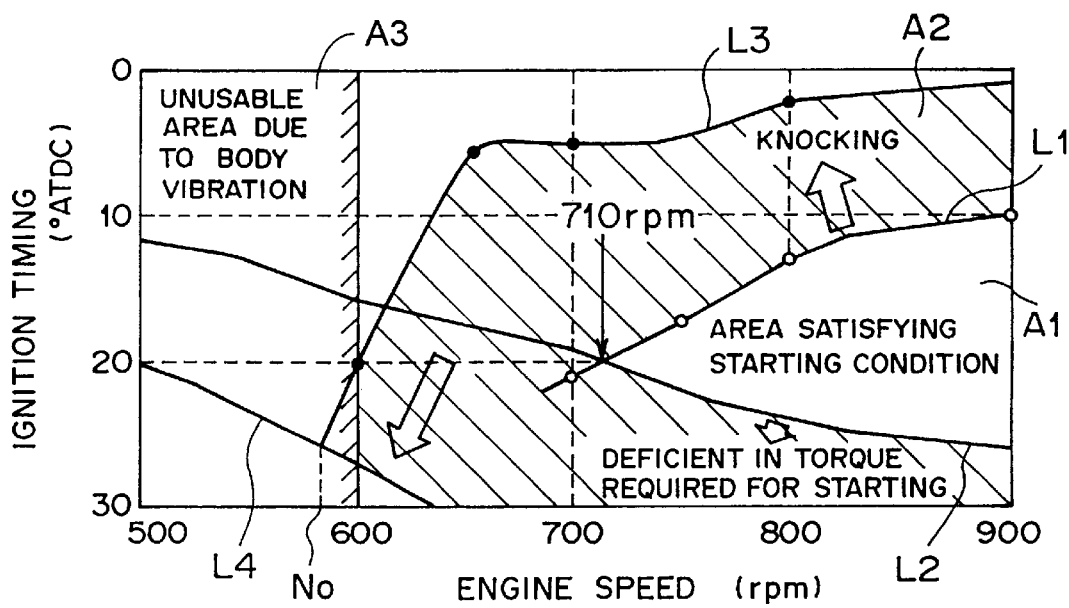
FIG. 9 is a chart for explaining an effect (decrease in idle speed) obtained by divisional injection in the spark ignition type in-cylinder injection internal combustion engine in accordance with the first embodiment of the present invention.

Since the spark ignition type in-cylinder injection internal combustion engine in accordance with the first embodiment of the present invention is thus configured, the divisional injection mode (divisional injection control) is performed, for example, as shown in FIG. 8.

Namely, first, the fuel octane number is determined (step S10) according to the fuel property information (fuel octane number information) detected by the fuel property detecting means 105; and then the engine operation state, i.e., that including engine speed Ne, throttle opening degree θth, cooling water temperature, intake air amount, intake temperature, atmospheric pressure, and the like, is read (step S20).

Subsequently, it is judged according to the cooling water temperature whether or not the engine operation state is in a divisional injection inhibiting region (step S30). Namely, when the cooling water temperature is not higher than a predetermined temperature (e.g., −10° C.), the operation state is judged to be in the divisional injection inhibiting region. If it is in the divisional injection inhibiting region, then the flow proceeds to step S80, where the state of a flag A is determined. The flag A is set to 1 and 0, respectively, when the divisional injection control is on and off. Here, if the flag A is 1 (i.e., divisional injection control is on), then the flow proceeds to step S90, where the divisional injection control is canceled (terminated), and the flag A is returned to 0. If the flag A is not 1 (i.e., divisional injection control is off), then the flow directly returns.

By contrast, if the engine operation state is not in the divisional injection inhibiting region, then the flow proceeds from step S30 to S40, where it is judged whether or not the engine operation state is in a divisional injection zone or not. This judgment is performed according to a map such as that shown in FIG. 3, for example, on the basis of the target load Pe and speed Ne of the engine to determine whether the engine operation state is in the divisional injection mode region or not. The map used here is provided according to the fuel property (fuel octane number). The map is selected in response to the fuel property information obtained at step S10, so that the divisional injection mode is chosen according to the fuel property information.

If it is judged at step S40 that the engine operation state is not in the divisional injection zone, then the flow proceeds to step S80 to perform the processing mentioned above. If the engine operation state is judged to be in the divisional injection zone at step S40, by contrast, then the flow proceeds to step S50, where the flag A is determined. Here, if the flag A is 1 (i.e., divisional injection control is on), then the flow directly returns.

By contrast, if the flag A is not 1 at step S50, then the flow proceeds to step S60, where the divisional injection control (divisional injection mode) is executed. After the divisional injection control is terminated, the flow proceeds to step S70, where the flag A is set to 1, and the flow returns.

The divisional injection control at step S60 is performed as follows:

1) First, a total A/F is set. The total A/F is computed on the basis of the engine load Pe and engine speed Ne, or set according to a map or the like. In order to set the total A/F, correction is effected according to the fuel property in view thereof, or a map corresponding to the fuel property information is used. In either case, when the load Pe is particularly high, the total A/F is lowered to about 12, to yield a fuel-rich state.

2) Then, the total fuel amount to be injected in one cycle is computed from the total A/F and the intake air amount information (information about the air amount taken into the combustion chamber in one cycle).

3) Since the intake stroke injection amount is constant, it is subtracted from the total fuel amount, thereby computing the compression stroke injection amount.

4) The fuel injection terminating timing is set according to the engine load Pe and engine speed Ne. Also, in order to set the fuel injection terminating timing, correction is effected according to the fuel property in view thereof, or a map corresponding to the fuel property information is used.

5) From the intake stroke injection amount, compression stroke injection amount, fuel injection terminating timing of the intake stroke injection, and fuel injection terminating timing of the compression stroke injection, the fuel injection starting timing of the intake stroke injection, and the fuel injection starting timing of the compression stroke injection are computed.

Preferably, in this case, the intake stroke injection timing of one cylinder is set not to overlap the compression stroke injection timing of another cylinder. Namely, if the intake stroke injection timing of one cylinder overlaps the compression stroke injection timing of another cylinder, the injection timing and injection state should be altered such that the intake stroke injection timing is shifted to a timing earlier or later than the compression stroke injection timing, or the intake stroke injection is divided to be performed before and after the compression stroke injection. In this case, the divisional injection at the intake stroke may be performed either twice respectively before and after the compression stroke injection timing or more.

When the injection timings are thus set not to overlap each other, the burden on the injector driving system (injector driver) can be alleviated, and it is unnecessary for the injector driver to be provided for each fuel injection valve as a separate circuit, thus allowing the cost to lower.

Also, though a simple configuration is basically attained when each of the intake stroke injection and the compression stroke injection is performed once, one of them may be divided into a plurality of times not only in order to avoid the above-mentioned overlapping injections. In particular, when the intake stroke injection is divided into a plurality of operations each with a minute quantity, atomization of fuel can be facilitated, whereby it may become effective in preventing knocks.

6) The intake stroke injection and the compression stroke injection are performed. This divisional injection is performed, for example, with characteristics with respect to load such as those of areas INJ3A and INJ3B in FIG. 7(A) or areas INJ4 and INJ5 in FIG. 7(B).

According to such divisional injection, as explained above with reference to FIGS. 4(A.) and 4(B), within the combustion chamber where a fuel-lean air/fuel mixture (whose air/fuel ratio A/F=30 to 60) formed by the intake stroke injection beforehand has been distributed, an air/fuel mixture with a relatively high fuel concentration generated by the compression stroke injection (an air/fuel mixture corresponding to a total air/fuel ratio A/F=15 to 20) flows in as a stratified flow, i.e., forms a rich air/fuel mixture layer in the vicinity of the spark plug 45 [see FIG. 4(B)].

Since the air/fuel mixture formed by the intake stroke injection is sufficiently lean, it cannot self-ignite. Also, the relatively rich air/fuel mixture formed as a stratified flow by the compression stroke injection cannot self-ignite either since it does not have enough time to proceed with a pre-reaction for knocking before ignition is effected by the spark plug 45 thereafter. Accordingly, without causing fuel to self-ignite, i.e., without knocking, the spark plug 45 effects ignition.

Due to this ignition, the rich air/fuel mixture in the vicinity of the spark plug 45 is burned. Upon burning, this enriched air/fuel mixture lacks air, thus generating a large amount of soot. As shown in FIG. 4(B), however, the lean air/fuel mixture formed by the intake stroke injection is burned as being ignited by thus generated soot, and so forth, whereby the soot is consumed. Accordingly, without discharging a large amount of soot, a sufficient combustion energy can be generated.

Consequently, as explained above with reference to FIGS. 5(A), 5(B), 6(A), and 6(B), the knocking limit output can be greatly enhanced while restraining the ignition timing from retarding. This remarkable enhancement in knocking limit output allows the idle speed to decrease. Accordingly, as shown in FIG. 3, for example, an idle speed Ne1 of this engine (performing the divisional injection) can be set lower than an idle speed Ne0 of a conventional spark ignition type in-cylinder injection type internal combustion engine (without performing the divisional injection).

Namely, in general, knocking is more likely to occur as the engine speed becomes lower but less likely to occur as the ignition timing is retarded. For example, as indicated by a curve L1 in FIG. 9, a knocking generation limit exists with respect to engine speed and ignition timing. On the other hand, upon starting a vehicle equipped with this engine, a minimal torque (torque required for starting) is necessary. This torque exists with respect to engine speed and ignition timing as indicated by a curve L2 in FIG. 9.

Accordingly, in order for the vehicle to start without knocking, it is necessary for the engine speed and ignition timing to be set at a state, which satisfies both conditions, i.e., within an area A1 not higher than the curve L1 but not lower than the curve L2. In this case, since the lower limit of engine speed is set to 710 rpm, the idle speed cannot be made lower than such a level of the speed.

In the spark ignition type in-cylinder injection type internal combustion engine of the present invention, however, the knocking limit output can greatly be enhanced while restraining the ignition timing from retarding as mentioned above. Consequently, the knocking generation limit with respect to the engine speed and ignition timing can be expressed by a curve L3 in FIG. 9, for example, whereas the torque required for starting with respect to the engine speed and ignition timing can be expressed by a curve L4 in FIG. 9, for example.

Accordingly, the region where the vehicle can start without knocking exists within an area A2, which is not higher than the curve L3 but not lower than the curve L4, whereby the lower limit of engine speed greatly decreases to $N_0$. Thus, while the idle speed can be lowered to such a level of speed as $N_0$; since the vehicle body is more likely to vibrate as the idle speed is lowered, there is an unusable area A3 (which is not higher than 600 rpm here).

Therefore, in this case, the idle speed is defined by this unusable area A3 (on the order of 600 rpm).

In a typical automobile engine, idle speed is raised when the air conditioner is on. Also in the engine of the present invention, the idle speed is made higher by a predetermined speed (e.g., about 50 rpm) when the air conditioner is on than when it is off.

At any rate, the engine of the present invention can greatly lower the idle speed, thus being advantageous in that it can remarkably improve gas mileage (fuel consumption ratio).

Figure 10:
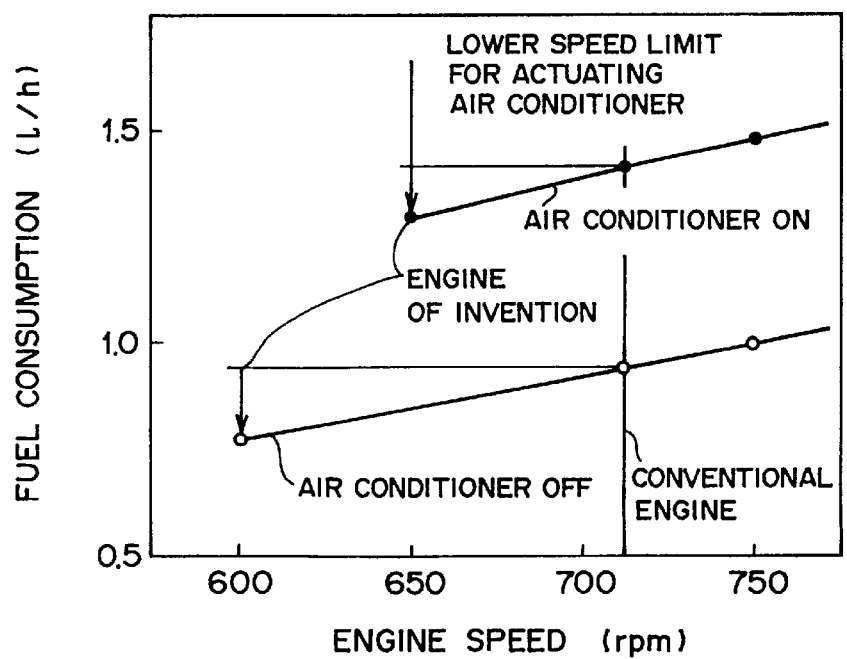
FIG. 10 is a chart for explaining an effect (improvement in fuel consumption ratio caused by decrease in idle speed) obtained by divisional injection in the spark ignition type in-cylinder injection internal combustion engine in accordance with the first embodiment of the present invention.

For example, FIG. 10 shows a fuel consumption characteristic according to engine speed. In the engine of the present invention, since the idle speed can be greatly lowered as compared with the idle speed based on the area A1 shown in FIG. 9 (the idle speed of the conventional engine), 700 rpm, the fuel consumption can be improved by on the order of 10% to 20%.

Also, the divisional injection in this engine can be used not only upon starting. The enhancement in output torque upon a low-speed operation of the engine caused by the divisional injection can greatly contribute to improving its driving performance.

Of course, when such divisional injection is used in an engine of a vehicle such as a manual transmission car for which it is not necessary to particularly enhance the idle speed in order to avoid knocking upon starting or secure a starting torque, engine can enhance output torque upon a low-speed operation, thus greatly contributing to improving the driving performance.

Also, when it is adopted in the engine of a manual transmission car, since the output torque upon a low-speed operation is enhanced, a torque margin is generated, whereby its flywheel can be provided with a high inertia. Consequently, it is advantageous in that the transmission can be prevented from generating clattering noise.

Further, since the above-mentioned possibility of knocking upon starting can be eliminated, it is quite advantageous from the viewpoint of enhancing the compression ratio. Namely, in the spark ignition type in-cylinder injection internal combustion engine, since knocking is intrinsically hard to occur due to the intake cooling effect, the compression ratio can be set higher. Further, transient knocks, which have been likely to occur immediately after acceleration in general, are hard to occur, whereby the ignition timing can be rapidly advanced upon acceleration. Though the compression ratio can further be enhanced from this viewpoint, there has been a limit to enhancement in compression ratio due to knocking upon starting. As such knocking upon starting is eliminated, the present invention is advantageous in that the compression ratio can further be enhanced.

In the following, a configuration of the spark ignition type in-cylinder injection internal combustion engine (hereinafter also referred to as in-cylinder injection engine) in accordance with a second embodiment will be explained with reference to FIGS. 11(A) to FIG. 13(C).

In this embodiment, the condition for performing the divisional injection is defined more specifically than in the first embodiment, such that the divisional injection is performed only in operation states where it is effective. Also, attention is paid so that the ignition timing is appropriately controlled when switching is effected between the divisional injection mode and another mode.

Namely, conditions for performing the divisional injection are set as explained in the following, and the divisional injection is performed when all of these conditions are established.

Divisional Injection Performing Conditions

1) The engine operation is neither in the engine stop mode nor in the starting mode. It is a prerequisite, and the divisional injection is not necessary at all unless the engine is normally operating.

2) A predetermined time has elapsed after the fuel pressure in the fuel supply path 23B downstream the high-pressure fuel pump 25 was determined to be high by a non-depicted fuel pressure detecting means. It is identical to the condition for allowing a compressed injection. This condition is set since the divisional injection is accompanied by the compressed injection. Namely, in order to establish stratified combustion, it is necessary for fuel to be fully atomized, i.e., injected with a high pressure. Also, if the fuel injection valve 21 is driven with a low fuel pressure, the injection pressure will become lower than the in-cylinder pressure, whereby fuel may flow back toward the fuel injection valve 21 when the fuel injection valve 21 opens, which should be prevented from occurring.

3) Water temperature>lean mode starting water temperature (e.g., 75° C.). It is an engine temperature condition under which stratified combustion enables stable burning.

4) Engine speed Ne<a predetermined speed. Since the divisional injection is less effective when the engine speed Ne is too high as compared with the stoichiometric feedback mode or enriched mode in terms of output, the speed region is restricted to where the effect of divisional injection is available.

5) Ev>a preset level. It relates to a knocking generation area and defines a condition under which knock-suppressing divisional injection can function effectively.

6) A knock-learning result is in a state where knock-generating possibility is high. It is also a condition under which knock-suppressing divisional injection can function effectively.

7) The engine operation is not in the lean mode (including both compressed lean and intake lean modes). It is due to the fact that divisional injection is unnecessary in a low load region of the engine where the lean mode is selected.

8) A/F tailing has been terminated. This condition is used for determining the state of stability of A/F (air/fuel ratio). Namely, it is used in order to appropriately set the fuel injection amount or the like when the operation shifts to divisional injection.

Here, when ΔTPS>a preset level is detected in the case where all the conditions 1) to 7) are established; since the driver is requesting high acceleration, A/F tailing is forcibly terminated before switching to the divisional injection mode.

When the various conditions noted above are established, divisional injection is performed. With respect to the pulse width (fuel injection period) of divisional injection, a pulse (main pulse) Tinjm at the time of intake stroke injection and a pulse (sub pulse) Tinjs at the time of compression stroke injection are computed as follows:

$$Tinjm = (Tb \times Kaf \times Kels \times Ktrn) \times Kdinjm + Td$$

$$Tinjs = (Tb \times Kaf \times Kels \times Ktrn) \times Kdinjs + Td$$

wherein Kdinjm is a main pulse dividing coefficient, Kdinjs is a sub pulse dividing coefficient, Tb is a base time, Kaf is a target A/F correction gain, Kels is another correction gain, Ktrn is an acceleration/deceleration correction gain, and Td is a dead time.

Here, preferably, for each of the main pulse Tinjm and sub pulse Tinjs, with a minimum injection time set with respect to the injection period thereof according to the capability of the fuel injection valve, a minimum clipping processing is performed.

In the divisional injection mode, pulse width is prohibited from being set by ΔPe. It is due to the fact that, as the injection timing extends to two strokes, the total air/fuel ratio deviates when the pulse width is corrected at their respective injection timings, thus failing to yield an appropriate air/fuel ratio, or control is complicated in order to attain an appropriate total air/fuel ratio.

In the case of the main pulse, the injection terminating timing is set at the end stage of the intake stroke or in the vicinity of the compression stroke starting time.

In this embodiment, in the case where the divisional injection mode is started from a mode other than the divisional injection mode, and in the case where the divisional mode is ended to start another mode, the ignition timing is held at that of the former mode only for a predetermined number of strokes.

Namely, as shown in FIG. 11(A), in the case where the divisional injection mode is switched to the intake injection mode at a certain point of time, ignition is effected at the ignition timing corresponding to the divisional injection mode for a predetermined number of strokes after the intake injection mode is started.

Namely, since the fuel injection in the divisional injection mode extends from the intake stroke to the compression stroke, even when the divisional injection mode is switched to the intake injection mode at a certain point of time, there may be a state where the ignition has not been performed yet because only the intake stroke injection in the divisional injection mode is terminated or in process, or the compression stroke injection after the intake stroke injection is terminated or in process.

For example, in FIG. 11(A), at the point of time where the injection mode switching signal is outputted, the fourth cylinder (#4) is in the process of compression stroke injection after the intake stroke injection in the divisional injection mode, whereas the second cylinder (#2) has completed only the intake stroke injection and is ready to perform the subsequent compression stroke injection. Accordingly, no ignition has been made yet in these cylinders. In FIGS. 11(A) and 11(B), #1 to #4 respectively indicate the first to fourth cylinders.

In such a case, even after the injection modes are switched, ignition is effected at an ignition timing corresponding to the divisional injection mode. For example, in the case shown in FIG. 11(A), at least the fourth cylinder (#4) and second cylinder (#2) are ignited at the ignition timing corresponding to the divisional injection timing. Then, after the fuel injection is switched to that corresponding to a new mode, the ignition timing is switched to that corresponding to the new mode.

Namely, sine the divisional injection is an injection state, which is hard to generate knocking (has a knock-suppressing effect), the ignition timing of divisional injection is set to an advancing side, whereas the ignition timing of the intake injection is set to a retarding side in order to restrain knocks from occurring. Consequently, in the cases where, as the injection state, the divisional injection is continued even after a signal for switching the divisional injection to the intake injection is outputted, like those of the fourth cylinder (#4) and second cylinder (#2), the ignition timing is retarded from its original timing (timing corresponding to the divisional injection) when ignition is effected at the ignition timing corresponding to the intake injection, thereby lowering output.

FIG. 11(B) shows a case where the intake injection mode is switched to the divisional injection mode at a certain point of time. Also in this case, ignition is effected at the ignition timing corresponding to the intake injection mode for a predetermined number of strokes after the divisional injection mode is started.

For example, in FIG. 11(B), at the point of time where the injection mode switching signal is outputted, the first cylinder (#1) has already terminated the intake stroke injection, whereas the third cylinder (#3) is in the process of the intake stroke injection. Accordingly, in this case, in both of the first and third cylinders, ignition is effected at the ignition timing corresponding to the intake injection mode even after the divisional injection mode is started.

Namely, in the cases where, as the injection state, the intake injection is continued even after a signal for switching the intake injection to the divisional injection is outputted, the ignition timing is advanced from its original timing (timing corresponding to the intake injection) when ignition is effected at the ignition timing corresponding to the divisional injection, thereby raising the possibility of knocking.

Therefore, in this embodiment, regardless of the timing of the signal for switching injection modes, the ignition at the time of divisional injection is effected at the ignition timing for divisional injection to secure the engine output, whereas the ignition at the time of intake injection is effected at the ignition timing for intake injection to suppress knocking.

In FIG. 11(B), in the fourth cylinder (#4), the fuel injection is executed on the basis of a signal obtained at the time when the operation mode is switched to the divisional injection mode. Namely, the fuel injection is effected by a new mode, i.e., divisional injection mode, and ignition is performed at the ignition timing corresponding to the divisional injection mode.

Figure 12:
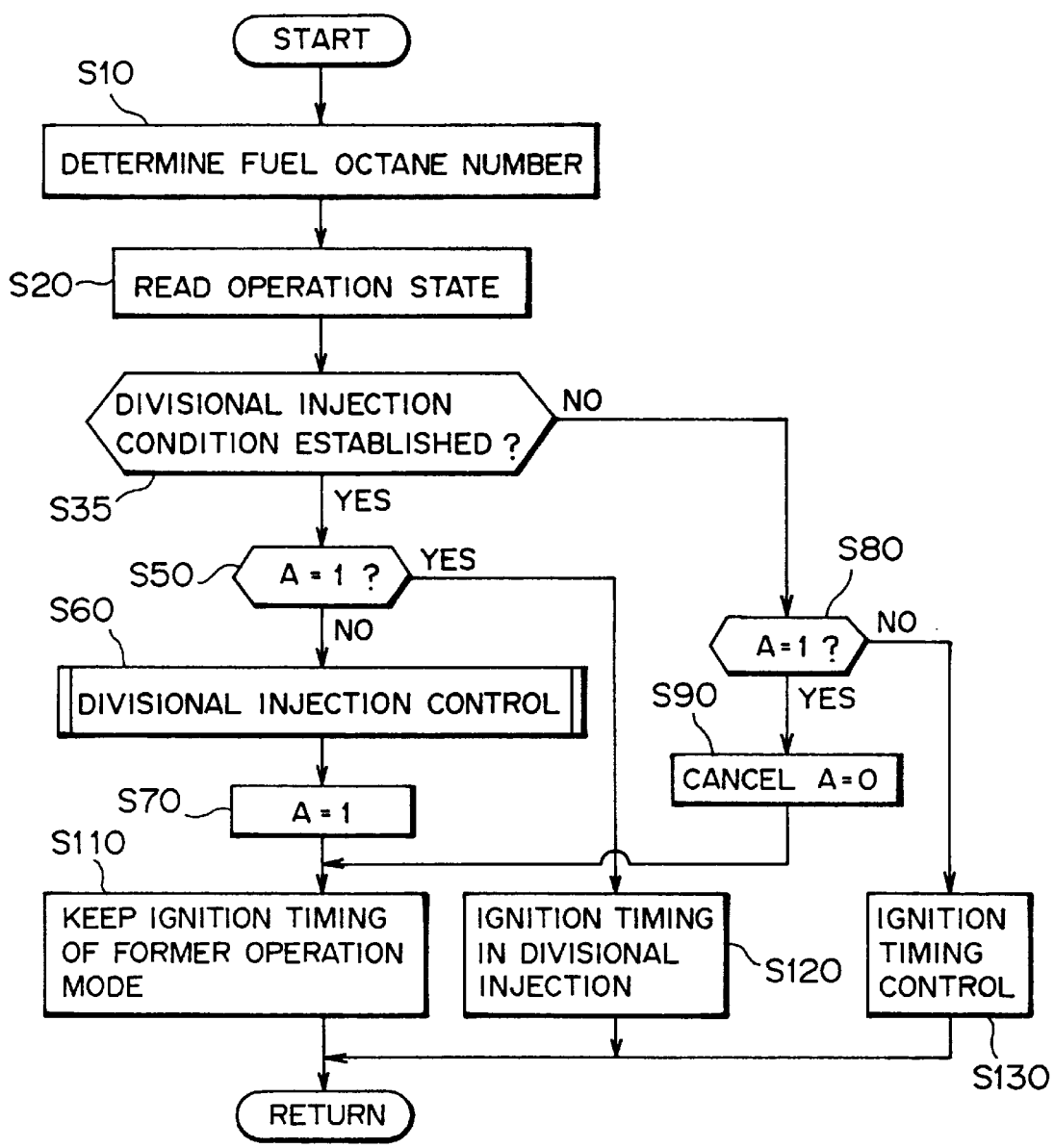
FIG. 12 is a flowchart for explaining divisional injection control in the spark ignition type in-cylinder injection internal combustion engine in accordance with the second embodiment of the present invention.
Figure 13:
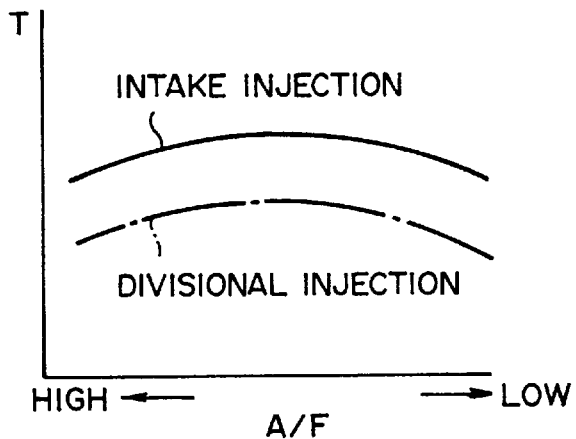
FIG. 13(A) is a chart for explaining an effect of divisional injection control in the spark ignition type in-cylinder injection internal combustion engine in accordance with the first or second embodiment of the present invention, showing a characteristic of torque (T) with respect to air/fuel ratio (A/F) when an optimal ignition timing is established.
FIG. 13(B) is a chart for explaining an effect of divisional injection control in the spark ignition type in-cylinder injection internal combustion engine in accordance with the first or second embodiment of the present invention, showing a characteristic of torque (T) with respect to ignition timing (IG) at an optimal air/fuel ratio.
FIG. 13(C) is a chart for explaining an effect of divisional injection control in the spark ignition type in-cylinder injection internal combustion engine in accordance with the first or second embodiment of the present invention, showing a characteristic of torque (T) with respect to air/fuel ratio (A/F) at a constant ignition timing.
Figure 13:
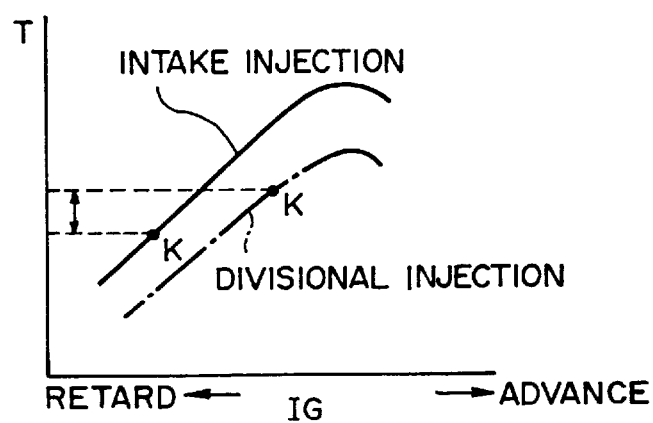
Figure 13:
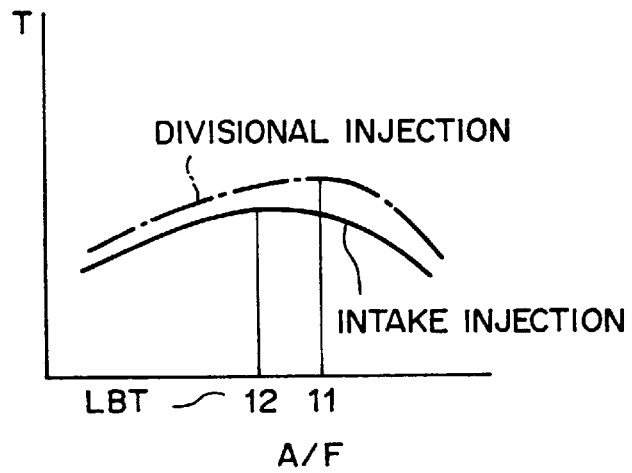

Since the spark ignition type in-cylinder injection internal combustion engine in accordance with the second embodiment of the present invention is configured as mentioned above, the divisional injection mode (divisional injection control) is performed as shown in FIG. 12, for example.

Namely, first, the fuel octane number is determined (step S10) according to the fuel property information (fuel octane number information) detected by the fuel property detecting means 105; and then the engine operation state, i.e., that including engine speed Ne, throttle opening degree θth, cooling water temperature, intake air amount, intake temperature, atmospheric pressure, and the like, is read (step S20).

Subsequently, it is judged whether or not the divisional injection conditions are established (step S35). Namely, whether all of the conditions: 1) the engine operation is neither in the engine stop mode nor in the starting mode, 2) a predetermined time has elapsed after the fuel pressure was determined to be high, 3) water temperature>lean mode starting water temperature, 4) engine speed Ne<a predetermined speed, 5) Ev>a predetermined level, 6) a knock-learning result is in a state where knock-generating possibility is high, 7) the engine operation is not in the lean mode, and 8) A/F tailing has been terminated are established or not.

If the divisional injection conditions are not established, then the flow proceeds to step S80, where a flag A is determined. The flag A is set to 1 and 0 respectively when the divisional injection control is on and off. Here, if the flag A is 1 (i.e., divisional injection control is on), then the flow proceeds to step S90, where the divisional injection control is canceled (terminated), the flag A is returned to 0, and then the flow proceeds to step S110. If the flag A is not 1 (i.e., divisional injection control is off), then the flow proceeds to step S130 to perform the ignition timing control by the corresponding modes (other than the divisional injection).

By contrast, if the divisional injection conditions are established, the flow proceeds to step S50, where the flag A is determined. If the flag A is 1 (i.e., the divisional injection control is on) here, then the flow proceeds to step S120 to perform the ignition timing control by the divisional injection mode.

If the flag A is not judged to be 1 at step S50, the flow proceeds to step S60 to execute the divisional injection control (divisional injection mode). After the divisional injection control is terminated, the flow proceeds to step S70, where the flag A is set to 1, and the flow further proceeds to step S110.

At step S110, the ignition control is effected while the ignition timing of the former operation mode is kept. This step includes a case where the a mode other than the divisional injection is switched to the divisional injection mode (where the flow successively proceeds with steps S35, S50, S60, S70, and S110) and a case where the divisional injection mode is switched to a mode other than the divisional injection (where the flow successively proceeds with steps S35, S80, S90, and S110). In either cases, the ignition control is performed such that, till the fuel injection is switched to that of a new mode, the ignition timing of the former operation mode is held to correspond to the fuel injection mode.

Consequently, in the case where the fuel injection is still in the divisional injection when the divisional injection is being switched to the intake injection, ignition is effected at the ignition timing for the divisional injection to secure the engine output; whereas, in the case where the fuel injection is still in the intake injection when the intake injection is being switched to the divisional injection, ignition is effected at the ignition timing for the intake injection to suppress knocking.

FIGS. 13(A) to 13(C) are charts showing torque characteristics generated in divisional injection and intake injection. Namely, FIG. 13(A) shows a characteristic of torque (T) with respect to air/fuel ratio (A/F) when an optimal ignition timing is attained; FIG. 13(B) shows a characteristic of torque (T) with respect to ignition timing (IG) at an optimal air/fuel ratio; and FIG. 13(C) shows a characteristic of torque (T) with respect to air/fuel ration (A/F) when the ignition timing is set to a knock point (K point).

As shown in FIG. 13(A), a higher output torque is obtained in the intake injection than in the divisional injection when the optimal ignition timing (ignition timing where the highest output torque is obtained) can be selected. As shown in FIG. 13(B), when the ignition timing (IG) is set in view of knocking suppression, a higher output torque is obtained in the divisional injection than in the intake injection. In such ignition timing taking the knocking suppression into consideration, as shown in FIG. 13(B), according to the setting of the total air/fuel ratio (A/F), there is a large region where a higher output torque can be obtained in the divisional injection than in the intake injection. In view of such characteristics, it can be seen that the divisional injection is effective in terms of output as well.

Also, as shown in FIG. 13(C), the air/fuel ratio (A/F) yielding the maximum torque can be set lower in the divisional injection, whereby it is particularly effective in enhancing output at a driving state corresponding to a case where the throttle is full open.

What is claimed is:

1. A spark ignition type in-cylinder injection internal combustion engine, comprising:
   a fuel injection valve for directly injecting fuel into a combustion chamber, said fuel injection valve injecting fuel during a compression stroke in a specific operation region wherein the engine is under an intermediate to high load, and an engine speed is lower than a preset engine speed to perform stratified combustion; and
   control means for driving and controlling said fuel injection valve such that, in said stratified combustion, prior to the fuel injection during said compression stroke, fuel is injected from said fuel injection valve during an intake stroke by such an amount that said fuel fails to self-ignite.

2. The spark ignition type in-cylinder injection internal combustion engine of claim 1, wherein said fuel injection during the intake stroke is performed a plurality of times according to a performance of said fuel injection valve.

3. The spark ignition type in-cylinder injection internal combustion engine of claim 1, wherein said control means drives and controls said fuel injection valve such that fuel is mainly injected during the compression stroke under a low load to perform stratified combustion, whereas fuel is mainly injected during the intake stroke under the intermediate to high load except for said specific operation region to perform pre-mixture combustion.

4. The spark ignition type in-cylinder injection internal combustion engine of claim 1, wherein said control means drives and controls said fuel injection valve such that, in said specific operation region under the intermediate to high load, a substantially constant amount of fuel is injected during the intake stroke, whereas an amount of fuel substantially proportional to a state of load is injected during the compression stroke.

5. The spark ignition type in-cylinder injection internal combustion engine of claim 1, wherein said control means drives and controls said fuel injection valve such that, in said specific operation region under the intermediate to high load, fuel is injected during the intake stroke by such an amount that an air/fuel ratio becomes in the order of 30 to 60, whereas fuel is injected during the compression stroke by such an amount that a total air/fuel ratio becomes richer than a stoichiometric air/fuel ratio.

6. The spark ignition type in-cylinder injection internal combustion engine of claim 5, wherein said total air/fuel ratio is about 12.

7. The spark ignition type in-cylinder injection internal combustion engine of claim 5, wherein the fuel injection amount during the compression stroke is in the order of 60% to 90% with respect to the total fuel injection amount.

8. The spark ignition type in-cylinder injection internal combustion engine of claim 1, wherein said internal combustion engine is a multiple-cylinder type internal combustion engine, each cylinder being provided with said fuel injection valve, said control means controlling said fuel injection valve such that a fuel injection timing of one cylinder during the intake stroke in said specific operation region under the intermediate to high load is prevented from overlapping a fuel injection timing of another cylinder during the compression stroke.

9. The spark ignition type in-cylinder injection internal combustion engine of claim 1, wherein said specific operation region is an operation region where a temperature of said engine is at least a predetermined temperature.

10. The spark ignition type in-cylinder injection internal combustion engine of claim 1, further comprising:
    fuel property detecting means for detecting property of the fuel,
    wherein said control means corrects said fuel injection amount during the intake stroke in said specific operation region under the intermediate to high load according to a result detected by said fuel property detecting means.

11. The spark ignition type in-cylinder injection internal combustion engine of claim 1, further comprising:
    an ignition timing control means for controlling an ignition timing of said engine,
    wherein said control means has mode selecting means for selecting one of a stratified combustion mode for controlling said fuel injection valve such that, when said operation state is in a low load region, fuel is injected during the compression stroke, a divisional stratified combustion mode for controlling said fuel injection valve such that, when said operation state is in said specific operation region, fuel is injected during the intake stroke prior to the fuel injection during the compression stroke by such an amount that said fuel is prevented from self-igniting, and a pre-mixture combustion mode for controlling said fuel injection valve such that, when said operation state is neither in said low load operation region nor in said specific operation region, fuel is injected during the intake stroke to operate said engine, and wherein, when said mode selecting means switches between said divisional stratified combustion mode and an operation mode other than said divisional stratified combustion mode, said ignition timing control means maintains, at least until said fuel injection timing of said fuel injection valve is switched from the combustion mode before switching to the combustion mode after switching, the ignition timing in conformity to said combustion mode before switching to effect control.

12. The spark ignition type in-cylinder injection internal combustion engine of claim 3, wherein said specific operation region is an operation region where a temperature of said engine is at least a predetermined temperature.

13. The spark ignition type in-cylinder injection internal combustion engine of claim 5, wherein said specific operation region is an operation region where a temperature of said engine is at least a predetermined temperature.

14. A spark ignition type in-cylinder injection internal combustion engine, comprising:

a fuel injection valve for directly injecting fuel into a combustion chamber, said fuel injection valve injecting fuel during a compression stroke in a specific operation region under an intermediate to high load to perform stratified combustion; and control means for driving and controlling said fuel injection valve such that, in said stratified combustion, prior to the fuel injection during said compression stroke, fuel is injected from said fuel injection valve during an intake stroke by such an amount that said fuel fails to self-ignite, and such that, in said specific operation region, all amount of fuel to be injected during the intake stroke becomes smaller than that during the compression stroke.

15. A spark ignition type in-cylinder injection internal combustion engine, comprising:

a fuel injection valve for directly injecting fuel into a combustion chamber, said fuel injection valve injecting fuel during a compression stroke in a specific operation region under an intermediate to high load to perform stratified combustion; and control means for driving and controlling said fuel injection valve such that, in said stratified combustion, prior to the fuel injection during said compression stroke, fuel is injected from said fuel injection valve during an intake stroke in an amount to prevent knocking during subsequent combustion.

* * * * *